US008452117B2

(12) United States Patent
Adams et al.

(10) Patent No.: US 8,452,117 B2
(45) Date of Patent: May 28, 2013

(54) BLOCK NOISE DETECTION AND FILTERING

(75) Inventors: Dale Richard Adams, Gualala, CA (US); Laurence A. Thompson, Saratoga, CA (US)

(73) Assignee: Silicon Image, Inc., Sunnyvale, CA (US)

( * ) Notice: Subject to any disclaimer, the term of this patent is extended or adjusted under 35 U.S.C. 154(b) by 665 days.

(21) Appl. No.: 12/703,623

(22) Filed: Feb. 10, 2010

(65) Prior Publication Data

US 2010/0202262 A1 Aug. 12, 2010

Related U.S. Application Data

(60) Provisional application No. 61/151,434, filed on Feb. 10, 2009.

(51) Int. Cl.
*G06K 9/40* (2006.01)

(52) U.S. Cl.
USPC ............ 382/262; 382/254; 382/264; 382/266

(58) Field of Classification Search
USPC .................................. 382/254, 262, 264, 266
See application file for complete search history.

(56) References Cited

U.S. PATENT DOCUMENTS

| 4,997,321 A | 3/1991 | Adams |
| 5,357,606 A | 10/1994 | Adams |
| 5,532,751 A | 7/1996 | Lui |
| 5,550,592 A | 8/1996 | Markandey et al. |
| 5,689,301 A | 11/1997 | Christopher et al. |
| 5,790,269 A | 8/1998 | Masaki et al. |
| 5,796,875 A | 8/1998 | Read |
| 5,852,475 A | 12/1998 | Gupta et al. |
| 5,857,118 A | 1/1999 | Adams et al. |
| 5,920,356 A | 7/1999 | Gupta et al. |
| 6,055,018 A | 4/2000 | Swan |
| 6,064,776 A | 5/2000 | Kikuchi et al. |
| 6,069,664 A | 5/2000 | Zhu et al. |
| 6,167,164 A | 12/2000 | Lee et al. |

(Continued)

FOREIGN PATENT DOCUMENTS

| EP | 0881837 | 12/1998 |
| EP | 1039760 | 9/2000 |

(Continued)

OTHER PUBLICATIONS

"Analog Devices CMOS 180 MHz DDS/DAC Synthesizer", AD9851, Rev. C, Analog Devices, Inc., www.analog.com.pp. 1-23 (1999).
Co-pending U.S. Appl. No. 10/753,909, filed Jul. 7, 2004.
Co-pending U.S. Appl. No. 10/889,855, filed Jul. 12, 2004.
Co-pending U.S. Appl. No. 11/487,144, filed Jul. 13, 2006.
Co-pending U.S. Appl. No. 11/512,754, filed Aug. 29, 2006.
Co-pending U.S. Appl. No. 11/941,050, filed Nov. 15, 2007.
Co-pending U.S. Appl. No. 12/204,760, filed Sep. 4, 2008.
Co-pending U.S. Appl. No. 11/437,357, filed May 19, 2006.
International Search Report PCT/US2007/084881 dated Mar. 25, 2008 pp. 1-3.

(Continued)

*Primary Examiner* — Anand Bhatnagar
*Assistant Examiner* — Soo Park
(74) *Attorney, Agent, or Firm* — Blakely, Sokoloff, Taylor & Zafman LLP

(57) ABSTRACT

Systems and methods for block noise detection and filtering are disclosed. One embodiment includes, computing difference magnitudes in pixel values for adjacent pixels in the image. The difference magnitudes can include horizontal difference magnitudes for horizontally adjacent pixels and vertical difference magnitudes for vertically adjacent pixels. One embodiment further includes using normalized sums of the difference magnitudes to determine a set of noise characteristics of the block noise and a set of image characteristics of the image and configuring inputs to the block noise filter using the set of noise and image characteristics.

26 Claims, 22 Drawing Sheets

U.S. PATENT DOCUMENTS

| | | | |
|---|---|---|---|
| 6,219,747 B1 | 4/2001 | Banks et al. | |
| 6,285,801 B1 | 9/2001 | Mancuso et al. | |
| 6,380,978 B1 | 4/2002 | Adams et al. | |
| 6,385,692 B2 | 5/2002 | Banks et al. | |
| 6,393,505 B1 | 5/2002 | Scalise et al. | |
| 6,421,090 B1 | 7/2002 | Jiang et al. | |
| 6,459,455 B1 | 10/2002 | Jiang et al. | |
| 6,473,476 B1 | 10/2002 | Banks | |
| 6,489,998 B1 | 12/2002 | Thompson et al. | |
| 6,515,706 B1 | 2/2003 | Thompson et al. | |
| 6,587,158 B1 | 7/2003 | Adams et al. | |
| 6,621,937 B1 | 9/2003 | Adams et al. | |
| 6,681,059 B1 | 1/2004 | Thompson | |
| 6,700,622 B2 | 3/2004 | Adams et al. | |
| 6,757,022 B2 | 6/2004 | Wredenhagen et al. | |
| 6,757,442 B1 | 6/2004 | Avinash | |
| 6,859,237 B2 | 2/2005 | Swartz | |
| 6,867,814 B2 | 3/2005 | Adams et al. | |
| 6,975,776 B2 | 12/2005 | Ferguson | |
| 6,999,047 B1 | 2/2006 | Holtslag | |
| 7,023,487 B1 | 4/2006 | Adams | |
| 7,027,099 B2 | 4/2006 | Thompson et al. | |
| 7,089,577 B1 | 8/2006 | Rakib et al. | |
| 7,126,643 B2 | 10/2006 | Song et al. | |
| 7,136,541 B2 | 11/2006 | Zhang et al. | |
| 7,154,556 B1 | 12/2006 | Wang et al. | |
| 7,206,025 B2 | 4/2007 | Choi et al. | |
| 7,236,209 B2 | 6/2007 | Martin | |
| 7,257,272 B2 | 8/2007 | Blake et al. | |
| 7,345,708 B2 | 3/2008 | Winger et al. | |
| 7,349,028 B2 | 3/2008 | Neuman et al. | |
| 7,362,376 B2 | 4/2008 | Winger et al. | |
| 7,391,468 B2 | 6/2008 | Shah | |
| 7,400,359 B1 | 7/2008 | Adams | |
| 7,412,096 B2 | 8/2008 | Neuman et al. | |
| 7,414,671 B1 | 8/2008 | Gallagher et al. | |
| 7,417,686 B2 | 8/2008 | Zhu | |
| 7,474,354 B2 | 1/2009 | Kawamura et al. | |
| 7,515,205 B1 | 4/2009 | Wang et al. | |
| 7,519,332 B1 | 4/2009 | Suematsu | |
| 7,529,426 B2 | 5/2009 | Neuman | |
| 7,551,800 B2 | 6/2009 | Corcoran et al. | |
| 7,557,861 B2 | 7/2009 | Wyman | |
| 7,605,866 B2 | 10/2009 | Conklin | |
| 7,657,098 B2 | 2/2010 | Lin et al. | |
| 7,659,939 B2 | 2/2010 | Winger et al. | |
| 7,667,773 B2 | 2/2010 | Han | |
| 7,710,501 B1 | 5/2010 | Adams et al. | |
| 7,865,035 B2 | 1/2011 | Lin et al. | |
| 7,940,992 B2 | 5/2011 | Johnson et al. | |
| 7,969,511 B2 | 6/2011 | Kim | |
| 7,986,854 B2 | 7/2011 | Kim et al. | |
| 8,189,952 B2 * | 5/2012 | Chen et al. | 382/275 |
| 8,195,022 B2 * | 6/2012 | Osamoto et al. | 382/275 |
| 8,265,416 B2 * | 9/2012 | Lin et al. | 382/266 |
| 2002/0149685 A1 | 10/2002 | Kobayashi et al. | |
| 2002/0149703 A1 | 10/2002 | Adams et al. | |
| 2002/0176113 A1 * | 11/2002 | Edgar | 358/3.27 |
| 2004/0042673 A1 | 3/2004 | Boon | |
| 2004/0189877 A1 | 9/2004 | Choi et al. | |
| 2005/0122433 A1 | 6/2005 | Satou et al. | |
| 2005/0128360 A1 | 6/2005 | Lu | |
| 2006/0072037 A1 | 4/2006 | Wyman | |
| 2007/0052845 A1 | 3/2007 | Adams | |
| 2007/0103588 A1 | 5/2007 | MacInnis et al. | |
| 2007/0223835 A1 | 9/2007 | Yamada et al. | |
| 2008/0123998 A1 | 5/2008 | Gomi et al. | |
| 2008/0143873 A1 | 6/2008 | Neuman | |
| 2008/0151103 A1 | 6/2008 | Asamura et al. | |
| 2008/0175512 A1 * | 7/2008 | Ohira | 382/263 |
| 2009/0052798 A1 * | 2/2009 | Kwon et al. | 382/264 |
| 2010/0054622 A1 * | 3/2010 | Adams | 382/269 |
| 2010/0061649 A1 * | 3/2010 | Hou et al. | 382/263 |
| 2010/0110235 A1 * | 5/2010 | Higuchi | 348/241 |
| 2011/0216984 A1 * | 9/2011 | Tezuka | 382/260 |
| 2012/0294525 A1 * | 11/2012 | Lukac | 382/167 |

FOREIGN PATENT DOCUMENTS

| | | |
|---|---|---|
| EP | 1434438 A2 | 6/2004 |
| EP | 1492344 A1 | 12/2004 |
| JP | 2001-245155 | 9/2001 |
| JP | 2005122361 A | 5/2005 |
| JP | 2007213125 A | 8/2007 |

OTHER PUBLICATIONS

International Search Report PCT/US2009/054427 dated Mar. 17, 2010 pp. 1-3.
International Search Report PCT/US2010/023775 dated Oct. 11, 2010, pp. 1-3.
International Search Report PCT/US2006/34785 dated Apr. 4, 2007, pp. 1-2.
Supplementary European Search Report 06 814 256 dated Mar. 31, 2010, pp. 1-7.
Final Office Action mailed Apr. 19, 2010 for U.S. Appl. No. 11/487,144, filed Jul. 13, 2006.
Non-Final Office Action mailed Aug. 20, 2010 for U.S. Appl. No. 11/487,144, filed Jul. 13, 2006.
Non-Final Office Action mailed Dec. 31, 2009 for U.S. Appl. No. 11/487,144, filed Jul. 13, 2006.
Non-Final Office Action mailed Mar. 18, 2008 for Issued Patent No. 7,400,359, U.S. Appl. No. 10/753,909, filed Jan. 7, 2004.
Non-Final Office Action mailed Sep. 11, 2009 for Issued Patent U.S. Patent No. 7,710,501, U.S. Appl. No. 10/889,855, filed Jul. 12, 2004.
Non-Final Office Action mailed Sep. 23, 2010 for U.S. Appl. No. 11/437,357, filed May 19, 2001.
Notice of Allowance mailed Feb. 8, 2010 for Issued Patent No. 7,710,510, U.S. Appl. No. 10/889,855, filed Jul. 12, 2004.
Notice of Allowance mailed Sep. 3, 2010 for U.S. Appl. No. 11/512,754, filed Aug. 29, 2006.
Restriction Requirement mailed Feb. 25, 2010 for U.S. Appl. No. 11/437,357, filed May 19, 2006.
Notice of Allowance mailed May 30, 2008 for Issued Patent No. 7,400,359, U.S. Appl. No. 101753,909, filed Jan. 7, 2004.
Written Opinion PCT/US2006/34785 dated Apr. 4, 2007, pp. 1-4.
Written Opinion PCT/US2007/084881 dated Mar. 25, 2008 pp. 1-4.
Written Opinion PCT/US2009/054427 dated Mar. 17, 2010 pp. 1-3.
Written Opinion PCT/US2010/023775 dated Oct. 11, 2010, pp. 1-5.
Notice of Allowance for U.S. Appl. No. 11/437,357 mailed Dec. 1, 2010.
Notice of Allowance for U.S. Appl. No. 11/487,144 mailed Dec. 9, 2010.
Non-Final Office Action for U.S. Appl. No. 11/941,050 mailed Feb. 1, 2011.
Non-Final Office Action for U.S. Appl. No. 11/512,754 mailed Jun. 25, 2010.
Non-Final Office Action for U.S. Appl. No. 11/512,754 mailed Dec. 13, 2010.
Notice of Allowance for U.S. Appl. No. 11/512,754 mailed Feb. 7, 2011.
Notice of Allowance for U.S. No. 11/487,144 mailed Mar. 21, 2011.
Notice of Allowance for U.S. Appl. No. 11/437,357 mailed Mar. 9, 2011.
Office Action for European Patent Application No. 06814256.1 mailed Jul. 16, 2010.
Office Action for European Patent Application No. 06814256.1 mailed Feb. 10, 2011.
Office Action for Canadian Patent Application No. 2,620,820 mailed Aug. 18, 2010.
Non-Final Office Action for U.S. Appl. No. 11/512,754 mailed May 11, 2011.
International Preliminary Report on Patentability for International Patent Application No. PCT/US2009/054427, Mailed Mar. 17, 2011, 5 pages.
Notice of Allowance for U.S. Appl. No. 11/941,050, Mailed Aug. 18, 2011, 10 pages.

* cited by examiner

| Interval | -1 | 0 | +1 |
|---|---|---|---|
| 4 | 1.7985 | 0.5825 | 1.0069 |
| 5 | 1.2627 | 0.3895 | 0.9570 |
| 6 | 1.1521 | 0.6720 | 1.0173 |
| 7 | 1.1908 | 0.3525 | 3.869 |
| 8 | 4.4361 | 0.5801 | 1.1058 |
| 9 | 1.2481 | 0.6040 | 1.6725 |
| 10 | 1.8644 | 0.3320 | 1.4620 |
| 11 | 1.6135 | 0.8803 | 0.6557 |
| 12 | 0.7176 | 0.6727 | 1.1608 |
| 13 | 1.2617 | 0.7048 | 0.8090 |
| 14 | 0.8741 | 0.4372 | 3.5881 |
| 15 | 3.8572 | 0.7577 | 1.0587 |
| 16 | 1.1330 | 0.7459 | 1.3802 |

*FIG. 16B*

BLOCK NOISE DETECTION AND FILTERING

CLAIM OF PRIORITY

This application claims priority to U.S. Provisional Patent Application No. 61/151,434 entitled "BLOCK NOISE DETECTION AND FILTER", which was filed on Feb. 10, 2009, the contents of which are expressly incorporated by reference herein.

BACKGROUND

Compression of digital content such as image, audio, or video content may introduce artifacts to the compressed digital content. The type and extent to which artifacts are introduced depend on data type and compression technique. Compression artifacts typically occur in media such as DVDs, compressed video formats such as MPEG-1, MPEG-2, MPEG-4, JPEG, etc. In particular, block noise may be present in digitally compressed video or image files.

BRIEF DESCRIPTION OF THE DRAWINGS

FIG. 16B depicts a table with examples of values obtained from manipulating summed difference magnitudes in FIGS. 15 and 16A.

DETAILED DESCRIPTION

Figure 1:
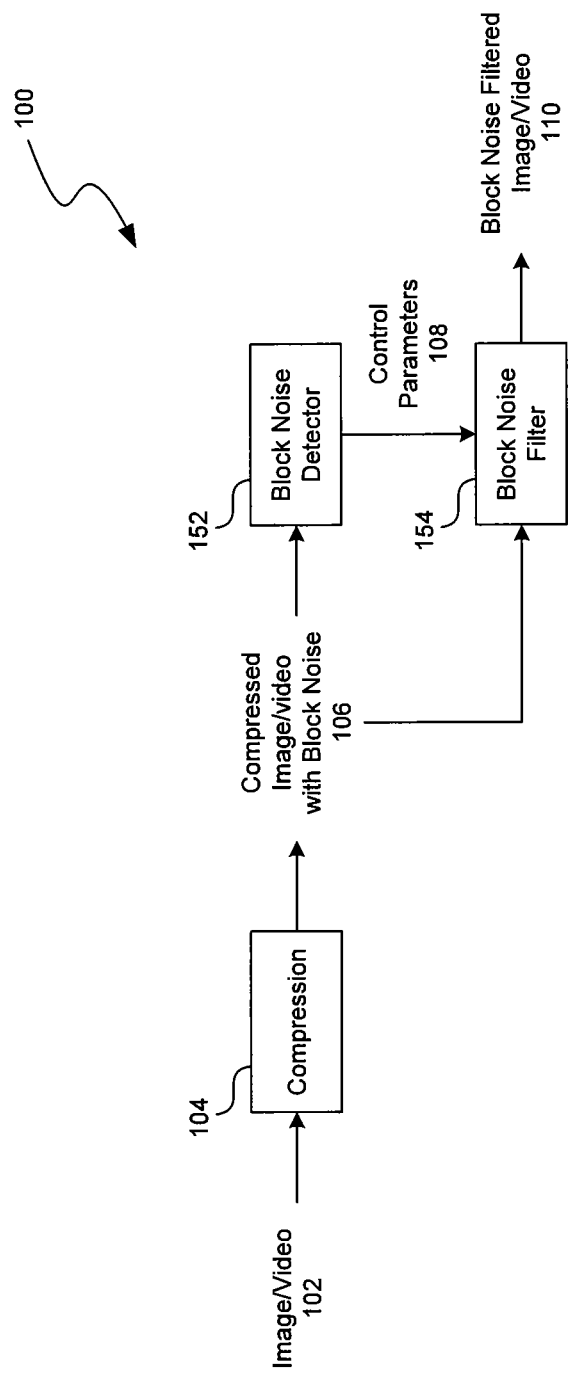
FIG. 1 illustrates a block diagram showing an example of how block noise is introduced into digital images and/or video and how a block noise filter is applied using control parameters determined by the block noise detector.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Embodiments of the present disclosure include systems and methods for block noise detection and filtering.

FIG. 1 illustrates a block diagram 100 showing an example of how block noise 106 is introduced into digital images and/or video 102 and how a block noise filter 154 is applied using control parameters determined by the block noise detector 152.

Typical image or video compression schemes introduce artifacts such as block noise into digital images/video 102. In particular, by applying a lossy compression scheme, block noise may be introduced into the image/video 106.

The techniques described herein related to a block noise detector 152 which analyzes and processes the affected digital image/video 106 and identifies attributes/characteristics of the block noise (e.g., block size, offset, boundary location, strength of block noise (e.g., severity of block noise)) and/or image characteristics (e.g., amount of detail in an image).

The block noise detector 152 can generate control parameters 108 to the block noise filter 154 using the block noise and/or image characteristics. The control parameters 108 can include block noise filter gain values, edge strength multipliers, etc. The block noise filter 154 can operate on the original image to reduce or remove the visibility of block noise artifacts.

In one embodiment, block noise introduced via digital compression can be detected by identifying vertical-only or horizontal-only edges in the image which are spaced at (approximately) fixed intervals. Detection can be performed by analyzing horizontal and vertical luma pixel differences to detect regularly spaced peaks. Based on this detection, a horizontal and vertical map is generated which indicates the location of block noise boundaries.

Chroma block size can be deduced from the detected luma block size and separate boundary maps are made for chroma using chroma pixel difference data. Images that have been resolution-scaled prior to detection are also accommodated using a modified schemed for determining size and offset, and provision is made in the block boundary maps for the blurring of block boundaries due to such scaling. These block boundary maps can be passed to a noise filter function which filters block noise in the image based on the map contents.

In general, block noise detection is performed on an entire or a substantial portion of an image frame, and the results of the detection are typically not complete until the entire frame or most of the frame has been analyzed. This improves the statistical reliability of the detection by including more data in the analysis. In the case of video sources, detection results may not be available until the end of the frame, thereby incurring a 1-frame delay in the detection process. The block noise filter operation would therefore normally be applied in the following frame period. The detection of block noise boundaries is spatial only, with no temporal aspect—i.e., it is performed on each single image frame individually in a video frame/field sequence.

In addition to the locations of horizontal and vertical block boundaries, this function also automatically determines control parameters for the block noise filter function. These parameters include the strength of the horizontal and vertical filters, and horizontal and vertical gradient multipliers used by the filter to suppress noise and filter artifacts along the edges of objects in the image.

The processes for detecting block noise and computing control parameters are described in additional detail with further references to the description associated with FIG. 6-16 and FIG. 19-20.

Figure 2:
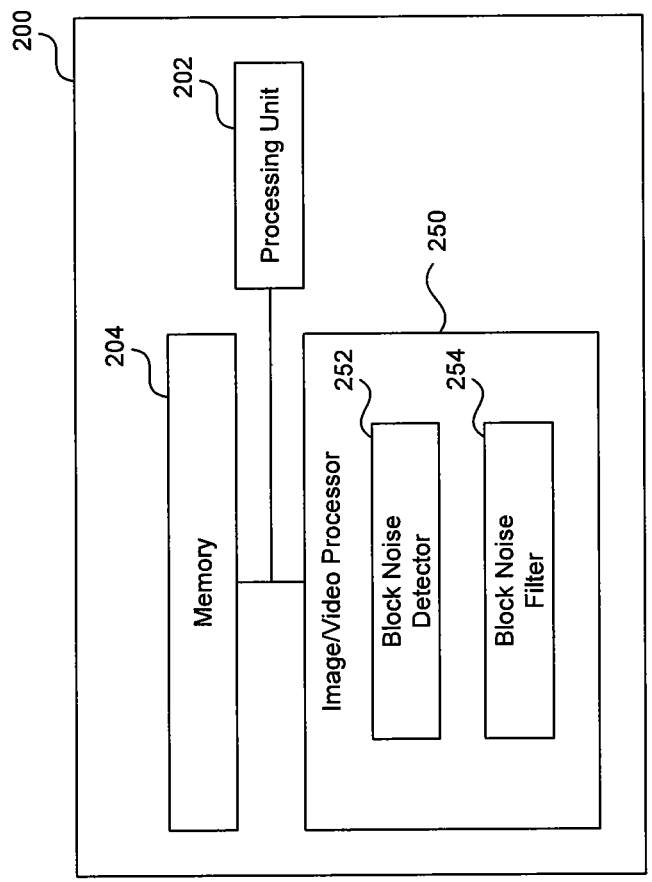
FIG. 2 depicts a block diagram illustrating an example of a system having an image or video processor having a block noise detector and/or block noise filter.

FIG. 2 depicts a block diagram illustrating an example of a system 200 having an image or video processor 250 having a block noise detector 252 and/or a block noise filter 254.

The system 200 includes a processing unit 202, a memory 204, and/or the image/video processor 250. In some embodiments, any of the above mentioned modules/devices or the functions represented thereof may be wholly or partially external to the system 200.

The system 200 is generally able to receive and process digital images, digital video, and/or digital audio originating from a variety of sources, including, but not limited to, Internet content (streaming and/or locally stored), content recorded by a digital imaging device (e.g., camcorder, camera, etc.), user generated content, content stored on a storage media (e.g., VHS, magnetic medium or optical medium), etc. The compatible types of optical media formats can include but is not limited to, CD, DVD, HD-DVD, Blu-ray, and HDV. The compatible optical disks may also be read only memory (ROM, write once-read many (WORM), Interactive (I), and/or erasable (E). Additional sources of video with block noise include, for example, digital broadcast television, satellite TV, digital cable TV, etc.

One embodiment of the system 200 includes a processing unit 202 coupled to the memory 204. The processing unit 202 can be any combination of software agents and/or hardware components able to execute instructions used by the system 200. The instructions may be accessed by communicating with the memory 204.

In one embodiment, the processing unit 202 internal and/or external requests and performs the necessary computations. The processing unit 202 can communicate with the memory 204, which in some embodiments, stores sequences of instructions executable by the processing unit 202 and/or the image processor 250.

The memory 204 can be any combination of software agents and/or hardware components that serve as data input/output buffer for the image processor 250. The data in the memory 204 can be received from any entity internal to and/or external to the system 200.

One embodiment of the system 200 includes the image/video processor 250, which may be coupled to the memory 204. The image processor 250 can be any combination of software agents and/or hardware components able to perform image and/or video processing, including, for example, block noise detection and block noise filtering. One embodiment of the image processor 250 includes a block noise detector 252 and/or a block noise filter 254. The digital image/video can be received or retrieved from memory 204.

In addition, to block noise detection and/or block noise filtering, described with further reference to the examples of FIG. 6-16 and FIG. 19-20, the processes that can be applied by the image processor 250 include by way of example but not limitation, geometric transformations (e.g., enlargement, scaling, reduction, rotation, etc.), color adjustments, brightness adjustments, contrast adjustments, quantization, conversion to a different color space, digital compositing, optical compositing, interpolation, alias reduction, filtering, image editing, image registration, image stabilization, image segmentation, etc.

Figure 4:
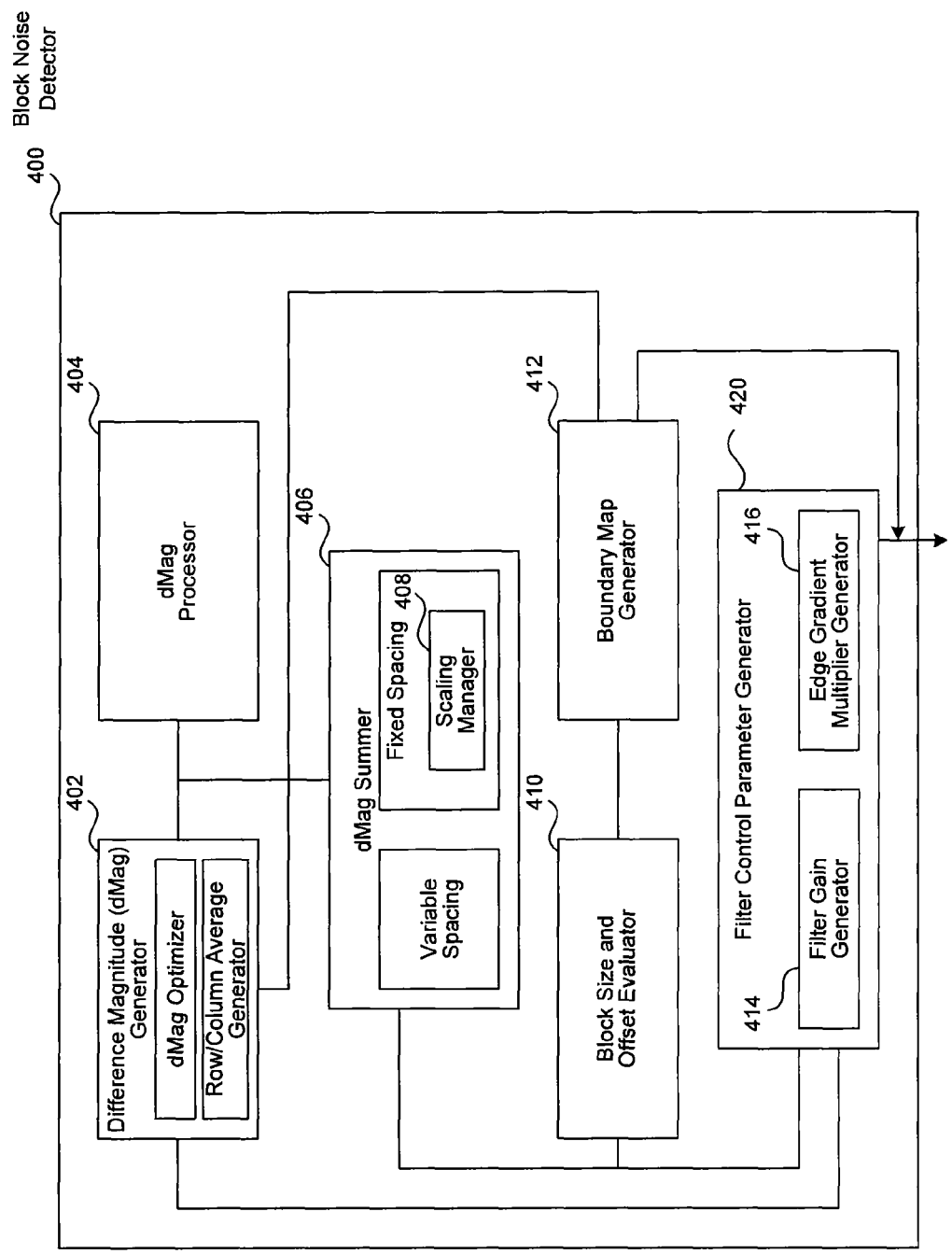
FIG. 4 depicts a block diagram illustrating an example of the components in a block noise detector.
Figure 5:
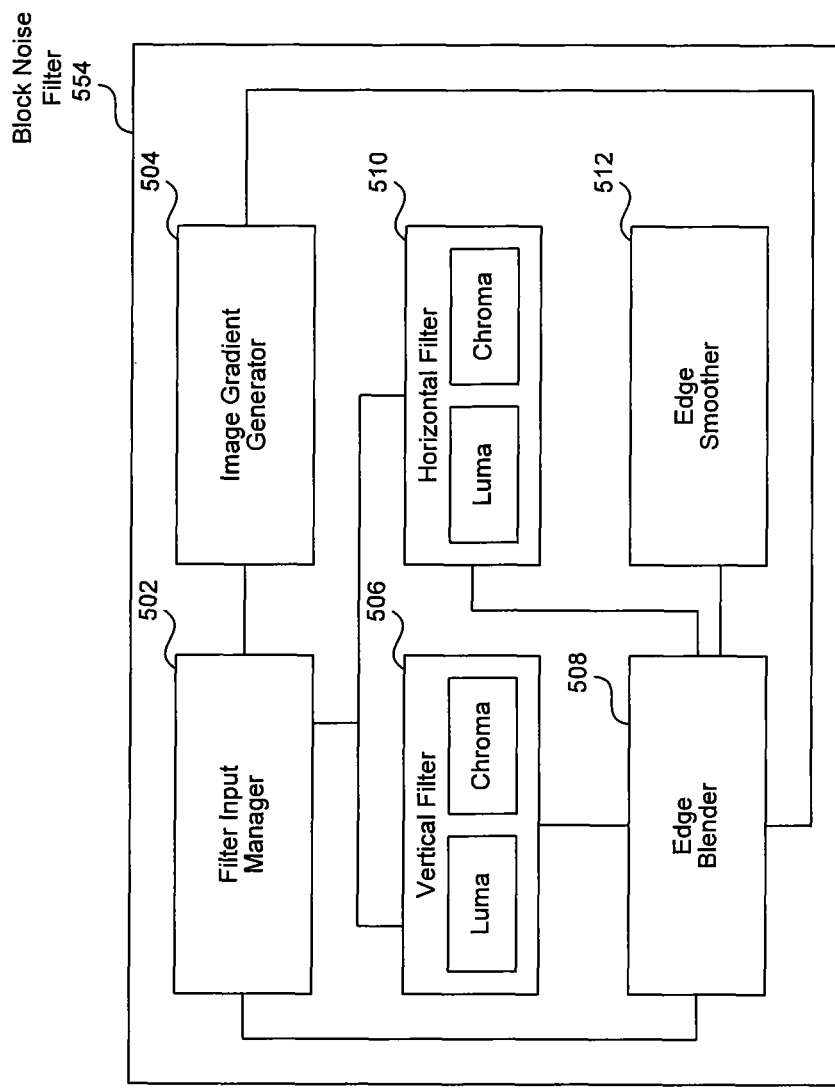
FIG. 5 depicts a block diagram illustrating an example of the components in a block noise filter.

Example components/modules of the block noise detector 252 are illustrated with further reference to the example of FIG. 4 and the example components of the block noise filter are illustrated with further reference to the example of FIG. 5.

Figure 3:
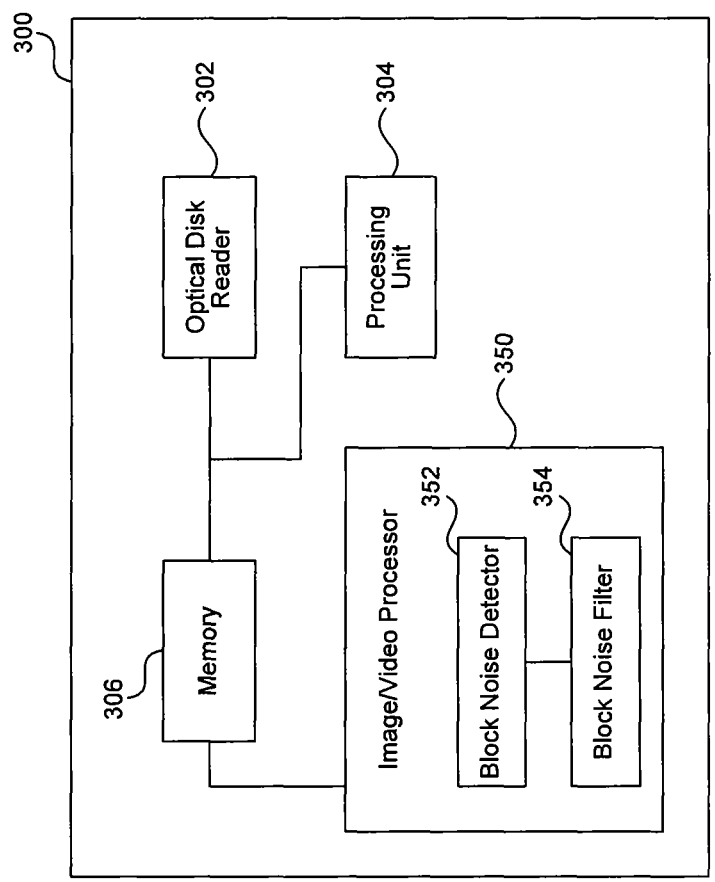
FIG. 3 depicts a block diagram illustrating an example of an optical disk apparatus having an image or video processor having a block noise detector and/or block noise filter.

FIG. 3 depicts a block diagram illustrating an example of an optical disk apparatus 300 having an image or video processor 350 having a block noise detector 352 and/or block noise filter 354.

The media player (e.g., optical disk apparatus 300) can include an optical disk reader 302, a processing unit 304, memory unit 306, and/or an image/video processor. In some embodiments, any of the above mentioned modules/devices or the functions represented thereof may be wholly or partially external to media player (e.g., the optical disk apparatus 300). In alternate embodiments, for media players other than an optical disk apparatus, it is appreciated that the optical disk reader 302 may be replaced by any other suitable media reader without deviating from the novel art of the disclosure. The other types of suitable media reader may operate in known and/or convenient means.

The optical disk reader 302 can be any combination of software agents and/or hardware components able to illuminate light on an optical disk, detect light reflected from an optical disk, and/or convert the detected light into an electrical signal. The optical disk reader 302 is able to read any optical disk including but not limited to, CD, DVD, HD-DVD, Blu-ray, and HDV. The compatible optical disks may also be read only memory (ROM, write once-read many (WORM), Interactive (I), and/or erasable (E).

In one embodiment, the optical disk apparatus 300 includes a memory 306 coupled to the optical disk reader 302. The memory 306 can be any combination of software agents and/or hardware components that serve as data input/output buffer for the optical disk reader 302. One embodiment of the optical disk apparatus 300 includes a processing unit 304 coupled to the optical disk reader 302. In some instances, the processing unit 304 is coupled to the memory 306 and/or the image/video processor 350. The processing unit 304 can be any combination of software agents and/or hardware components able to execute instructions used by the optical disk apparatus 300.

In one embodiment, the processing unit 304 handles internal and/or external requests and performs the necessary computations. The processing unit 304 can communicate with the memory 406, which in some embodiments, stores sequences of instructions executable by the processing unit 304 and/or the image/video processor 350. The image/video processor 350 can be any combination of software agents and/or hardware components able to perform image, video processing, and/or digital audio processing.

In one embodiment, the processor 350 includes a block noise detector 352 and/or a block noise filter 354 to perform some or all of the tasks associated with block noise detection and/or filtering. Example components/modules of the block noise detector 252 are illustrated with further reference to the example of FIG. 4 and the example components of the block noise filter are illustrated with further reference to the example of FIG. 5.

FIG. 4 depicts a block diagram illustrating an example of the components in a block noise detector 452.

The block noise detector 452 includes a difference magnitude (dMag) generator 402, a dMag processor 404, a dMag summer 406 having variable spacing/fixed spacing modules and a scaling module 408, block size and offset evaluator 410, a boundary map generator 412, a filter gain generator 414, and/or an edge gradient multiplier generator 416 (e.g., which may be components of the filter control parameter generator 420). In some embodiments, any of the above mentioned modules/devices or the functions represented thereof may be wholly or partially external to the detector 452.

The difference magnitude (dMag) generator 402 can be implemented, for example, as software embodied in a computer-readable medium or computer-readable storage medium on a machine, in firmware, in hardware, in a combination thereof, or in any applicable known or convenient device or system. This and other engines described in this specification are intended to include any machine, manufacture, or composition of matter capable of carrying out at least some of the functionality described implicitly, explicitly, or inherently in this specification, and/or carrying out equivalent functionality.

The dMag generator 402 can be any combination of software agents and/or hardware components able to compute difference magnitudes in pixel values for adjacent pixels in an image (e.g., a frame or an image frame of a video). In one embodiment, the dMag generator 402 includes an optimizer and a row/column average generator.

In one embodiment, difference magnitudes (dMag) of an image are used in block noise detection of an image or video. Difference magnitudes can be determined by the generator 402 calculating horizontal and vertical 1-pixel differentials in pixel values. These are the magnitude of the difference between adjacent pixel locations—i.e., for pixel location N, the difference magnitude is the absolute pixel value of pixel N minus pixel N+1. Difference magnitudes can be computed for both luma and chroma.

The computed dMag values can be optimized (e.g., by the dMag optimizer) by one or more of a series of operations to enhance the signal-to-noise ratio (SNR) for indicating block noise. For example, the difference values resulting from block noise are typically of relatively small magnitude compared to those from the major features in an image. For example, the crosshatch of vertical and horizontal lines stemming from the boundaries between noise blocks is typically faint compared to the outlines of other figures in the image.

To prevent the larger magnitude image features from swamping out the block noise differences, and possibly causing false positive block noise boundary identification, the magnitude of difference values over a certain threshold can be limited to or near the threshold value. As an example, with an image using 8-bit representation for pixel values, such a threshold might be 10 (out of the 8-bit maximum of 255).

Furthermore, the small peaks in the difference magnitude due to block noise boundaries are typically one pixel wide. (In some cases they may be slightly larger due to the effects of up-scaling, chroma up-sampling, or simply the image pixel values.) Consequently, such features can be thus detected and isolated.

One way of doing this is to use a filter process which excludes such features. If the output of such a filter is then subtracted from the image it leaves only the smaller features such as the difference magnitude values due to block noise. This process increases the signal-to-noise ratio of the difference magnitude image, where the 'signal' in this case is the difference magnitude of the boundaries between noise blocks and is typically the result of the block noise.

In one embodiment, the row/column average generator sums then averages horizontal and vertical difference magnitudes in a direction perpendicular to each (e.g., rows in the horizontal difference magnitude are averaged (vertically), and the columns in the vertical difference magnitude are averaged (horizontally). Using the results, the row/column average generator can generate a vector of horizontal difference magnitudes which is the width of the image, and a vector of vertical difference magnitudes which is height of the image. The averaging process tends to reinforce the regular block boundary features. The more irregularly positioned residual image data or random noise data is not reinforced, however, and results in a varying background level in the difference magnitude averages.

Figure 6:
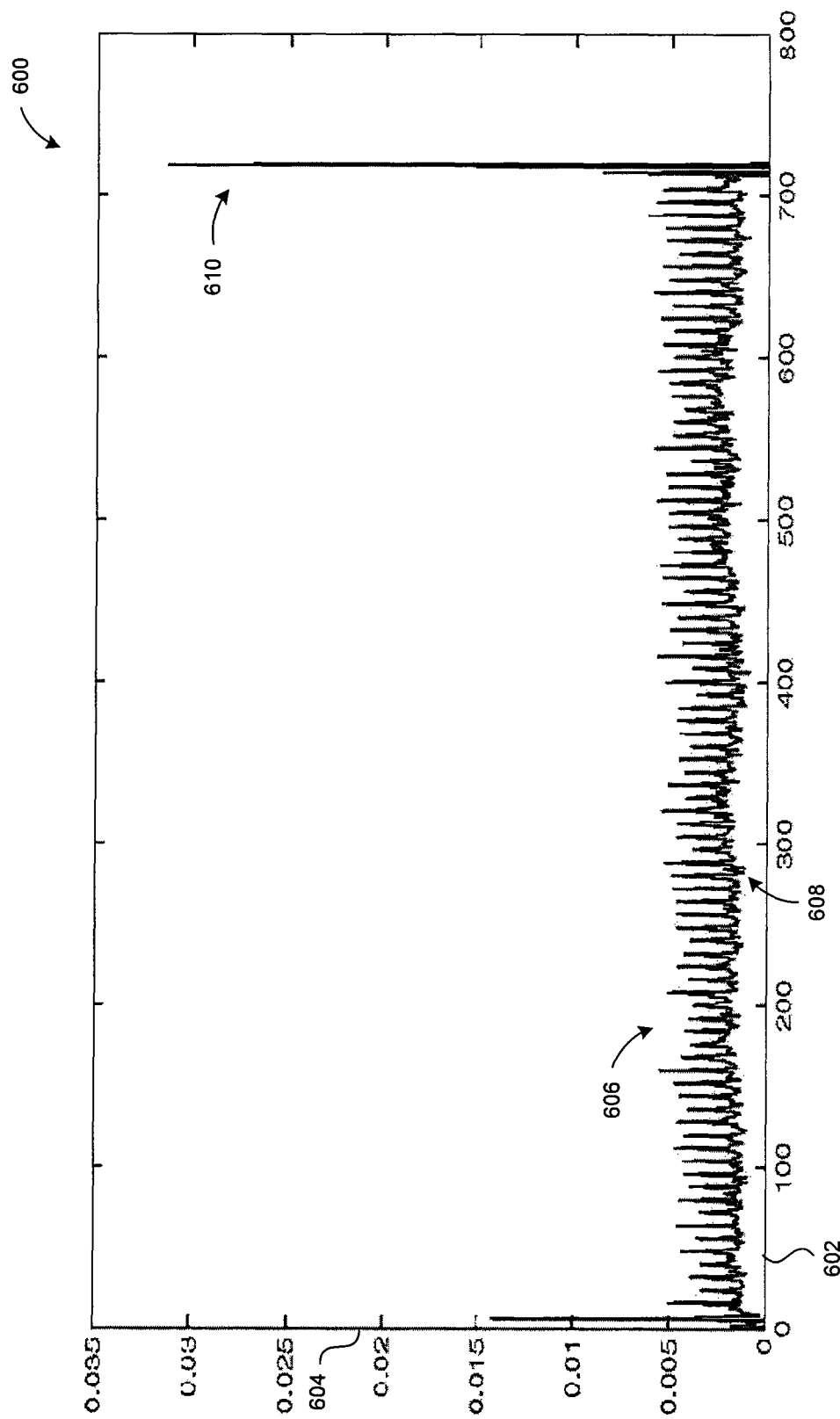
FIG. 6 depicts an example of an average of difference magnitudes over rows or columns.

FIG. 6 depicts an example of an average of difference magnitudes (dMag) over rows or columns, showing a plot 600 of the averaged horizontal difference magnitude. The difference magnitude for each horizontal location is shown on the vertical axis 604 and the pixel location across the width of the image is shown along the horizontal axis 602. The regularly spaced peaks 606 in the image typically correspond to the horizontal boundaries between blocks.

The average or 'DC' level 608 of the plot results mainly from the remains of random noise and low-level image data. The large spikes 610 at the ends of the image 600 are caused by the large difference between the original image and the narrow vertical black bars at the left and right of the image. For purposes of illustration, only the horizontal difference magnitude plot is shown here (and in the following sections). Similar results are obtained with the vertical plot.

This method is generally performed for block boundary locations which are the same for the vertical difference magnitude across all columns, and for the horizontal difference magnitude across all rows. In the instances where the block size varies significantly over the image, a modified procedure may be performed.

As illustrated in the example of FIG. 6, there is typically a background or 'DC' level 608 present in the averaged difference magnitude vector. This is largely removed by using a median filter approach similar to that of a previous processing step. A median filter can be applied, by the row/column average generator to the averaged difference magnitude, and the result is then subtracted from the averaged difference magnitude. The median filter is applied to an area of 1×N pixels, where N could be fixed or programmable. As in the previous case, an N value of 7 has been shown empirically to work well.

Figure 7:
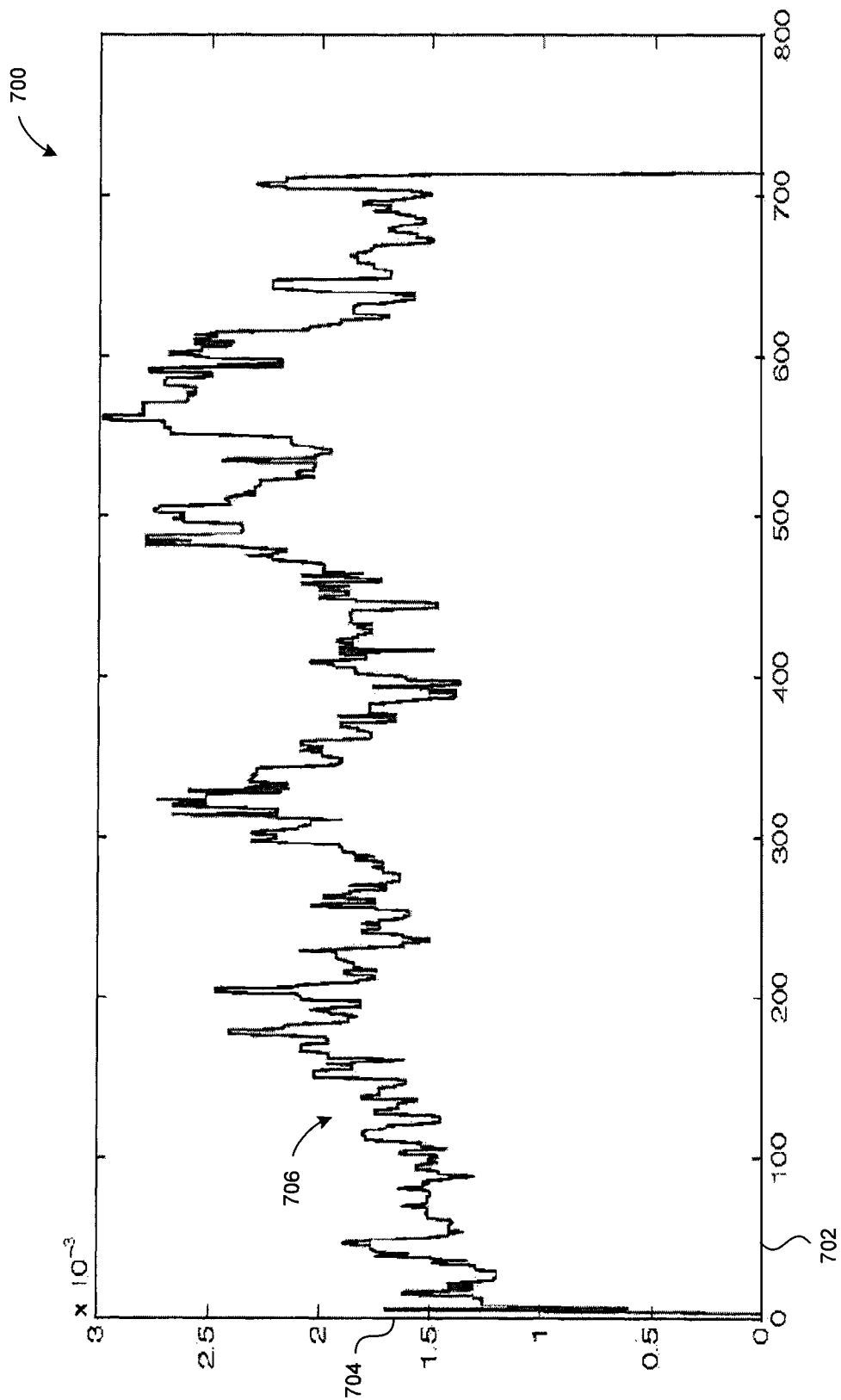
FIG. 7 depicts an example of an output of a median filter applied to the average difference magnitude.

FIG. 7 depicts an example of an output 706 of a median filter applied to the average difference magnitude. (Note that the vertical scale 704 in the image 700 is normalized to the plot's data contents, so the median filter output appears exaggerated compared to the previous plot).

Figure 8:
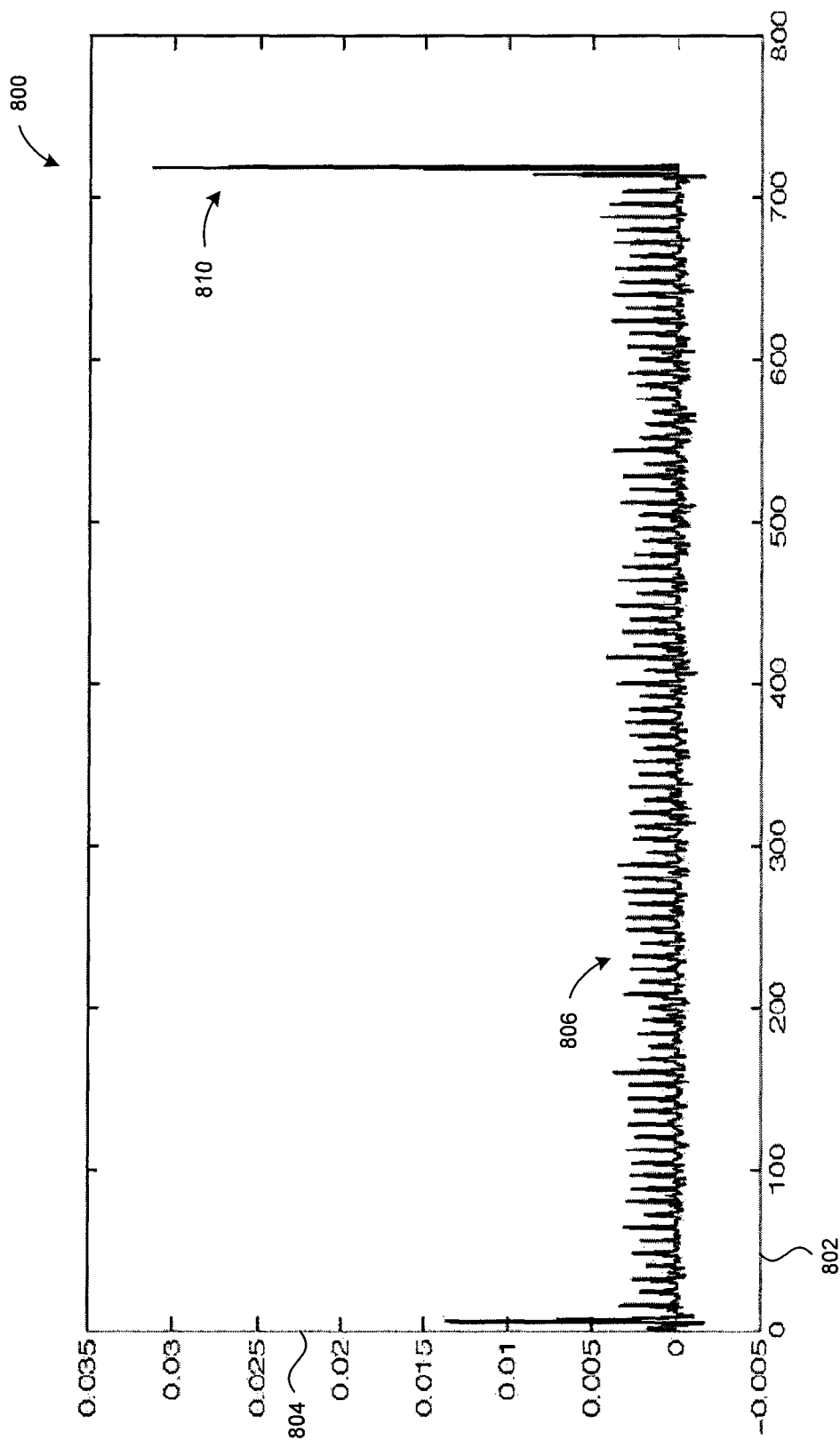
FIG. 8 depicts an example of the average difference magnitude with the DC level removed.

FIG. 8 depicts an example of the average difference magnitude with the DC level removed by subtracting the output of the median filter from the averaged difference magnitude. It can be readily seen that the background or 'DC' level has been removed.

The example of FIG. 8 shows that there are still spikes 810 at the edge of the averaged difference magnitude due to the black boundaries of the original image. These boundaries may be caused by aspect ratio correction (i.e., letterbox, pillarbox) or sometimes are just small black strips at the image edges. Subsequent steps will analyze the averaged difference magnitude to determine the size and location of the block boundaries represented by the peaks in the data. However, the presence of these very large spikes can throw off the analysis of the block size and location due to their magnitude. Consequently, it is beneficial to remove such spikes or to significantly reduce their magnitude prior to detection of the block size and location.

One method of dealing with these spikes is simply to suppress all values near the edge of the difference magnitude vector. While this can often work well, it assumes knowledge of where the actual edges of the image are located. This is not always known reliably, however. The technique used here is to identify the first few maximum values in the vector, compare the magnitudes of those maximums, and then, based on the results of the comparisons, reduce the amplitude of the largest peaks.

Figure 9:
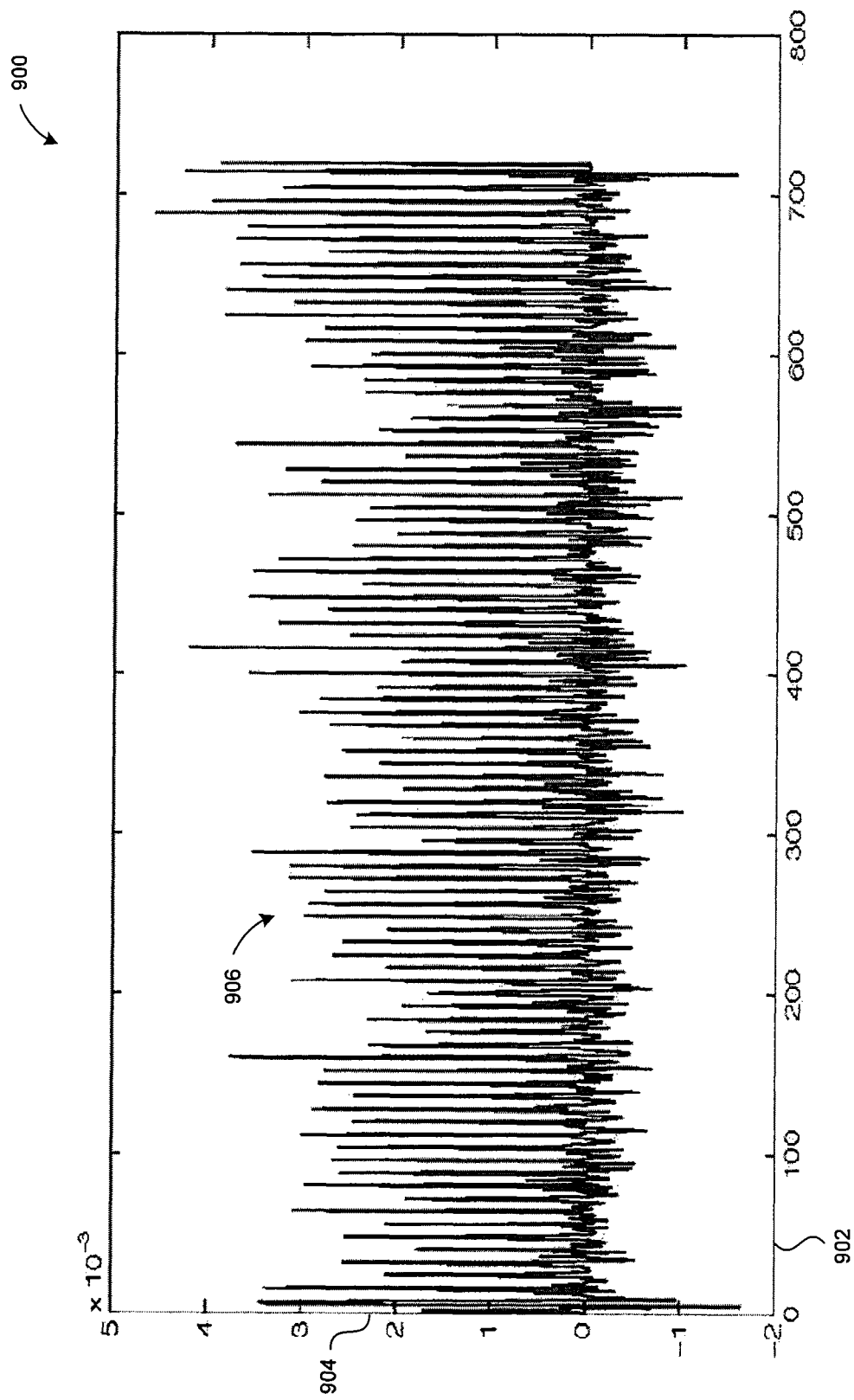
FIG. 9 depicts an example of the average difference magnitude with the DC level removed and edge spikes suppressed.

The results of applying this algorithm (e.g., by the row/column average generator) to the averaged difference magnitude minus the median are shown in the example of FIG. 9. (Note that the vertical scale 904 in the image is normalized to the plot data contents, so the reduction of the large peaks results in a more uniform scale for the overall data set.)

One embodiment of the detector 404 includes a dMag processor 404. The dMag processor 404 can be implemented, for example, as software embodied in a computer-readable medium or computer-readable storage medium on a machine, in firmware, in hardware, in a combination thereof, or in any applicable known or convenient device or system. This and other engines described in this specification are intended to include any machine, manufacture, or composition of matter capable of carrying out at least some of the functionality described implicitly, explicitly, or inherently in this specification, and/or carrying out equivalent functionality.

The dMag processor 404 can be any combination of hardware components and/or software agents able to analyze, process, and/or filter the difference magnitude data to increase the SNR which indicates block noise in an image or video frame.

In one embodiment, the dMag processor 404 implements a filter for isolating features corresponding to block noise. For example, a median filter can be used for isolating the features. The median filter, or other similar filters, can select a median-valued pixel in a small area. For the horizontal difference magnitude the processor 404 can apply a median filter to a horizontally-oriented area of 1×N pixels; for the vertical difference magnitude the processor 404 can apply the median filter to a vertically-oriented area of N×1 pixels. N in this case could be fixed or programmable. For example, an N value of 7 can be used, primarily since the most common block size is 8 pixels. In one embodiment, the processor 404 subtracts the output of the median filter from the unfiltered difference magnitudes, with values less than zero being clipped to zero. This process can remove the majority of the image features, thus increasing the signal-to-noise ratio for detection of the boundaries between noise blocks.

In one embodiment, the dMag processor 404 can suppress the difference magnitude values around object edges in the image. Even after subtracting the median value from the difference magnitudes, there is still a residual of object edges from the original image. These can be further reduced by detecting edges in the original image and suppressing the difference magnitude at those locations.

In one embodiment, the processor 404 performs edge detection, for example, by applying both vertical and horizontal filters (e.g., 3×3 Sobel filters) to the luma portion of the original image, and then taking the absolute value of each result to yield the vertical and horizontal gradient magnitudes. The Sobel filters are, for example:

$$HorSobelFilter3 \times 3 = \begin{bmatrix} -1 & 0 & 1 \\ -2 & 0 & 2 \\ -1 & 0 & 1 \end{bmatrix};$$

$$VertSobelFilter3 \times 3 = \begin{bmatrix} 1 & 2 & 1 \\ 0 & 0 & 0 \\ -1 & -2 & -1 \end{bmatrix};$$

(Note that the output of the filters must be normalized by dividing by 4.)

The gradient magnitude is compared to a threshold value and the difference magnitude can be set to zero at locations where the gradient magnitude exceeds the threshold. The horizontal and vertical difference magnitudes are processed separately using the appropriate gradient magnitude. A typical threshold value can be set to 20 for an 8-bit gradient magnitude representation. This process further improves the signal-to-noise ratio of the difference magnitude data.

One embodiment of the detector 404 includes a dMag summer 406. The dMag summer 406 can be implemented, for example, as software embodied in a computer-readable medium or computer-readable storage medium on a machine, in firmware, in hardware, in a combination thereof, or in any applicable known or convenient device or system. This and other engines described in this specification are intended to include any machine, manufacture, or composition of matter capable of carrying out at least some of the functionality described implicitly, explicitly, or inherently in this specification, and/or carrying out equivalent functionality.

The dMag summer 406 can be any combination of hardware components and/or software agents able to generate fixed and/or variable interval/spacings sums.

The summer 406 can sum the difference magnitudes at varying spacings and offsets to identify size of noise blocks and their locations. The summer 406 can compute normalized sums of difference magnitudes which are uniformly (or substantially uniformly) spaced across the difference magnitude vector at a range of interval spacings and at a range of offsets from the start of the data.

The interval sizes can range from a minimum to a maximum block size (MinSize:MaxSize) and the offsets range can range from a minimum to a maximum starting location (MinOffset:MaxOffset). The interval size identifies the size of the blocks while the offset identifies the position of blocks. The summer 406 can sum difference magnitude data individually for each entry in the range of block sizes and for each entry in the range of offsets. The summer 406 can then normalize the summation based on the number of blocks of each size which could be present across the number of locations in the difference magnitude vector.

Once the sums for all the interval sizes and offsets are calculated, the mean of all the sums is computed by the summer 406. This is subtracted from each of the interval/offset sums to improve the SNR. The negative results can be clipped to zero.

The interval size and offset which aligns with the actual locations of the block boundary peaks in the difference magnitude vector typically has the largest (or near largest) sum. The same will be true for integer multiples of that size interval. This interval size (and multiples of it) also repeats at offsets of the interval size as they align with the block boundary peaks in the difference magnitude vector.

Figure 10:
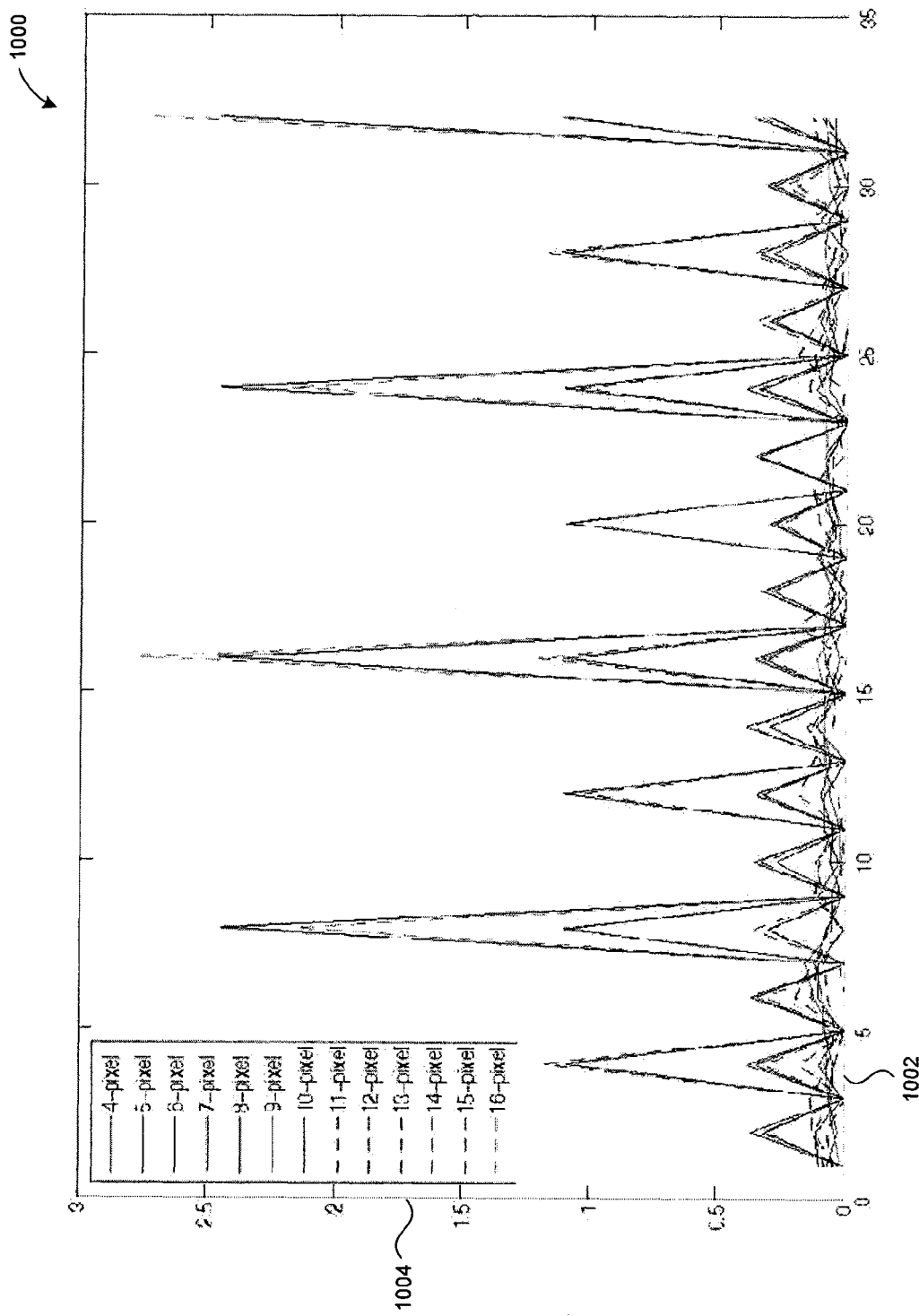
FIG. 10 depicts an example of normalized summed difference magnitudes at various block spacings and offsets

FIG. 10 depicts an example of normalized summed difference magnitudes at various block spacings and offsets showing the resulting interval/offset sums for the horizontal difference magnitude vector. The axis 1002 shows the offset value, the axis 1004 shows the amplitude of the normalized summed difference magnitudes, and that there are different curves shown in the plot 1000 for the different interval sizes.

The summer 406 can compute the sums for all interval sizes, in this example, from 4 to 16, and for offsets from 1 to 32. The highest amplitude values in this plot are for block sizes of 8 and 16. Both sizes have peaks which repeat every 8 pixels, indicating that the block size is most likely 8. The offset of the first value is 8, indicating the first block boundary is located at or near the 8th pixel location (which is expected for 8-pixel wide blocks where the first block is aligned to the left edge of the image).

Figure 11:
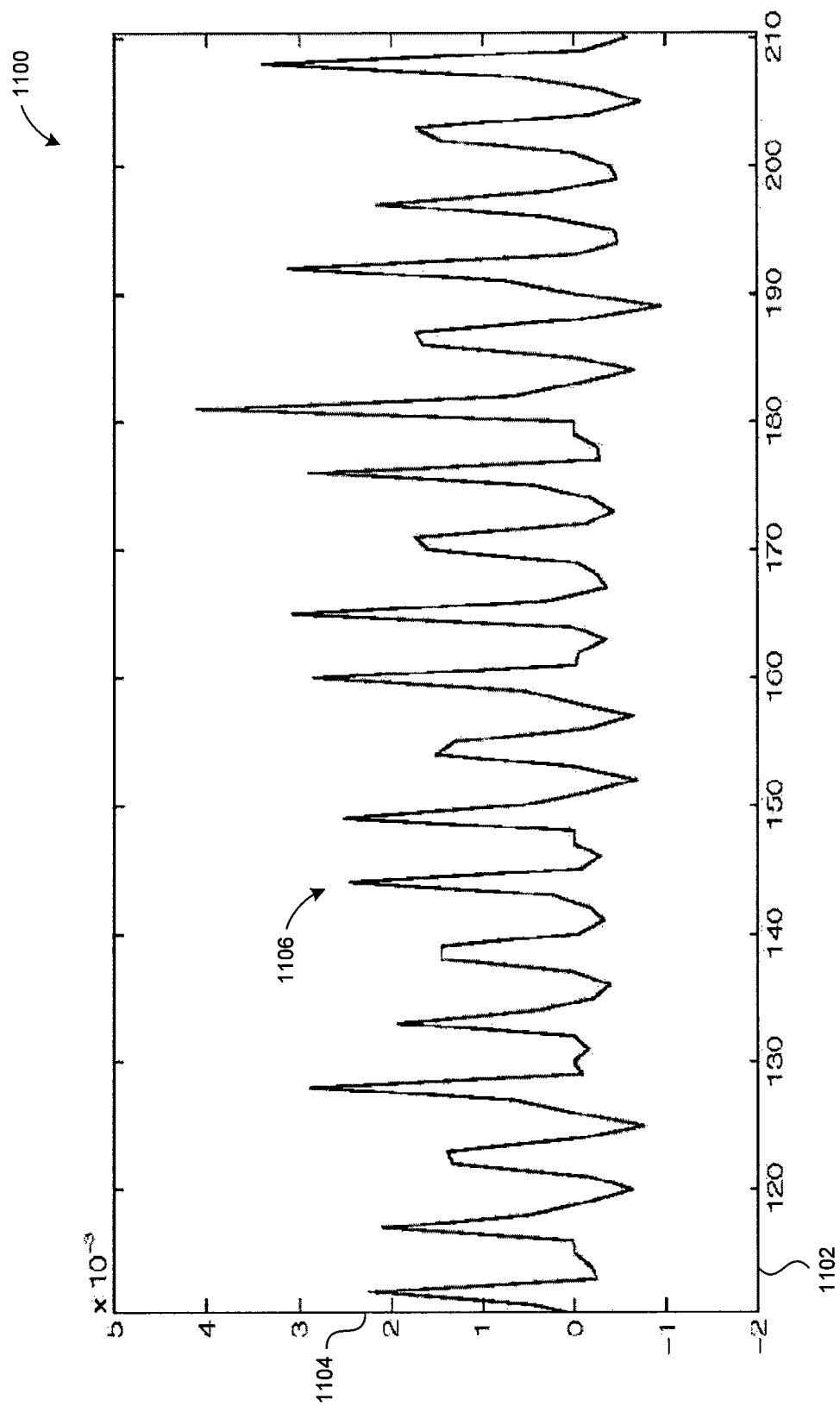
FIG. 11 depicts an example of an averaged difference magnitude for an image that has been scaled.

When an image has been scaled prior to block noise detection, sharp boundaries between blocks may be smeared across multiple (e.g., two) pixels. This occurs due to the low pass filters inherent in most scalers and the fact that the number of pixels in the image—and therefore the number of pixels in a block—is altered. As a result, the block boundary peaks detected in the difference magnitude vectors may not be single-pixel wide peaks, but can be more than one pixel wide. FIG. 11 depicts an example of an averaged difference magnitude for an image that has been scaled and illustrates the peak smearing that can occur.

Plot 1100 is a magnified section of the vertical difference magnitude of an image which has been scaled down by a scaling ratio of 2/3. As a result, the 24 pixels which contain three original 8-pixel blocks are scaled to 16 pixels, resulting in three 5⅓ pixel blocks (on average). In the plot 1100 of the example of FIG. 11, it can be seen that every third peak is actually 2 pixels wide due to the smearing of block boundaries in the down-scaling process.

Figure 12:
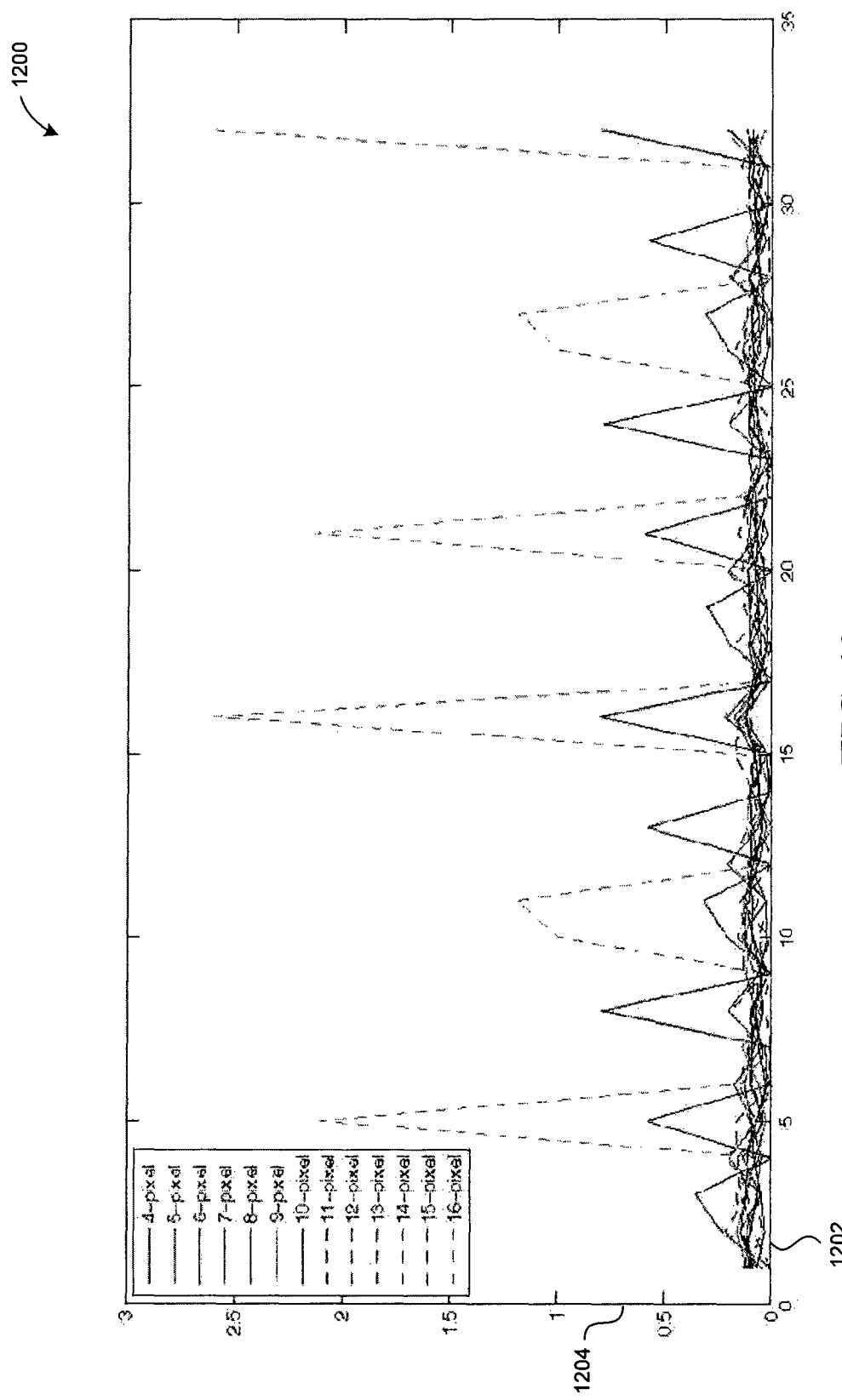
FIG. 12 depicts an example of normalized summed difference magnitudes at various block spacings and offsets for an image that has been scaled.

When the magnitude difference vector shown in plot 1100 is processed to compute interval/offset sums as described in the previous step, the smeared block boundaries result in interval peaks which can be more than 1 pixel wide. FIG. 12 depicts an example of normalized summed difference magnitudes at various block spacings and offsets for an image that has been scaled.

In the example plot 1200, the interval size with the maximum amplitude is 16, which corresponds to groups of three 5⅓ pixel blocks. The offset spacing between the interval-16 peaks varies between 5 and 6 pixels, depending on which portion of the 2-pixel wide interval peak is used to determine the distance to the next peak. Lower amplitude intervals also show a similar behavior—e.g., the 8-pixel interval also has clearly smeared interval peaks. These smeared interval peaks make it more difficult to determine what the block size actually is, by adding uncertainty to the peak locations and by reducing the interval peak amplitude (since the values for a nominal offset are spread across more than one location).

One way around this problem is to consolidate smeared interval peaks into a single value (e.g., by the scaling manager 408). One embodiment of the summer 406 includes the scaling manager 408. The scaling manager 408 can be implemented, example, as software embodied in a computer-readable medium or computer-readable storage medium on a machine, in firmware, in hardware, in a combination thereof, or in any applicable known or convenient device or system. This and other engines described in this specification are intended to include any machine, manufacture, or composition of matter capable of carrying out at least some of the functionality described implicitly, explicitly, or inherently in this specification, and/or carrying out equivalent functionality. The scaling manager 408 can be any combination of hardware components and/or software agents able to adapt the summation process to images that have been scaled.

For example, the scaling manager 408 can consolidate instances of an interval peak which is not bordered on each side by zero values into a single peak. This can be performed, for example, by adding the two values on each side of the peak to the peak value and then setting the bordering values to zero. The summing operation is performed only for interval/offset values which are larger than both the adjacent values.

Figure 13:
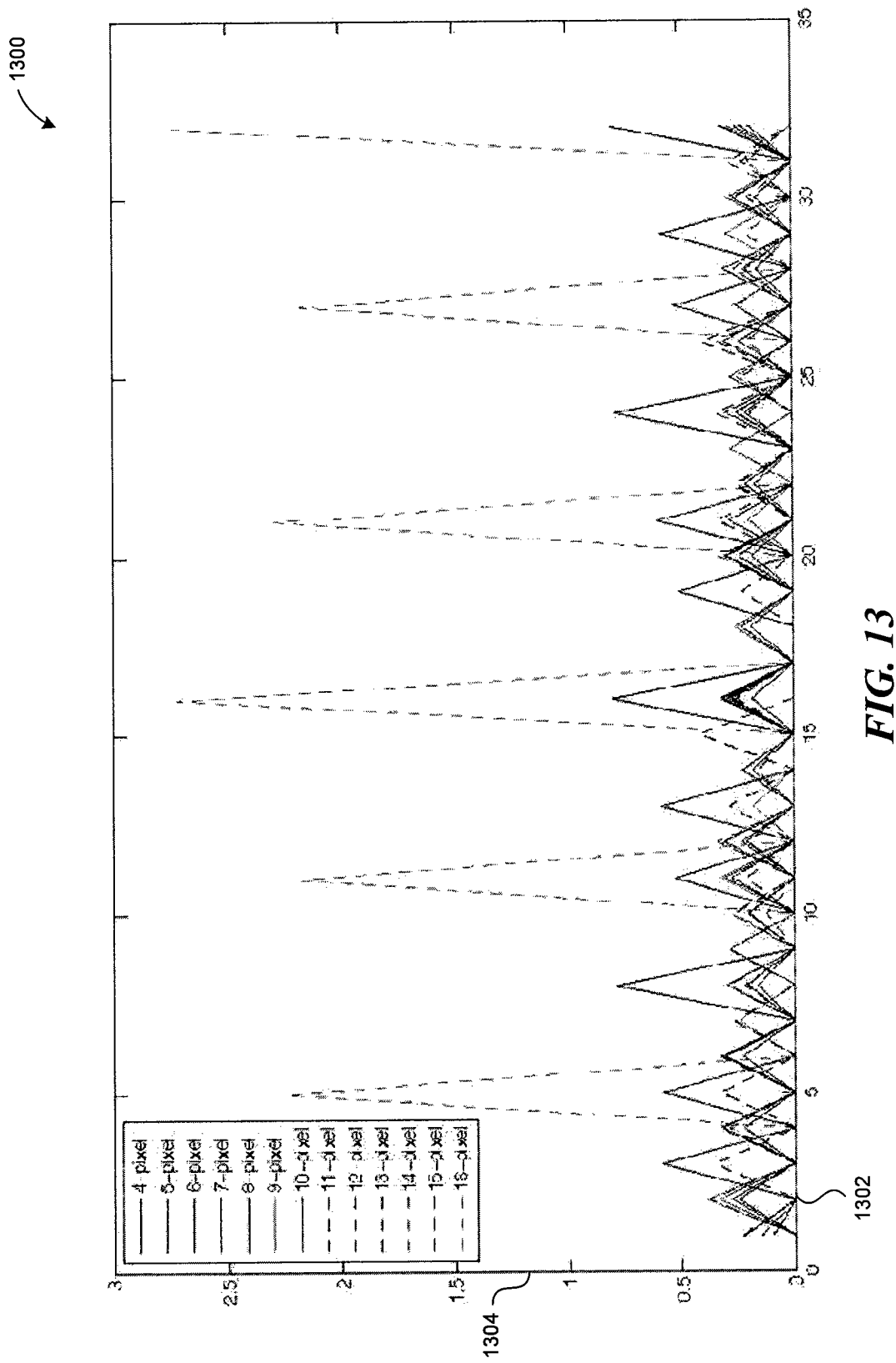
FIG. 13 depicts an example of normalized summed difference magnitudes at various block spacings and offsets for an image that has been scaled where adjacent non-zero interval values are summed.

Examples of results of summing adjacent non-zero interval values are shown in the example plot 1300 of FIG. 13. This is based on the same data as plot 1200 in FIG. 12, but the interval values have been summed for adjacent non-zero locations. Each peak location is now more clearly defined, and with a regular amplitude across the varying offsets.

Note that where scaling of an image has not occurred, each peak is typically clean, with zero values on each side. Consequently, performing the peak data merging operation described above has very little or no effect and leaves the interval/offset data essentially unchanged. In general, the merged interval/offset data set provided identical or superior results to that for the original interval/offset set.

Figure 14:
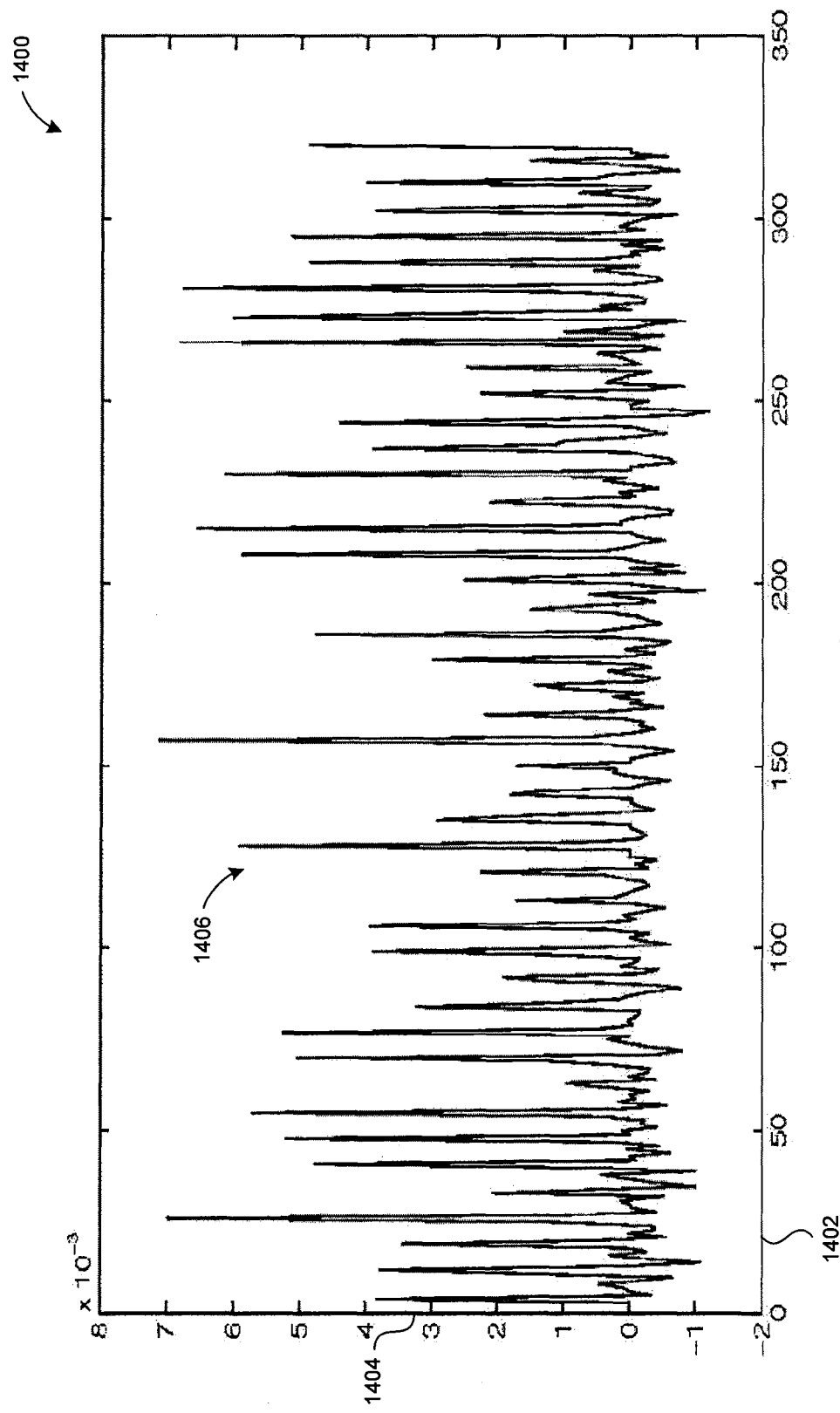
FIG. 14 depicts an example of an averaged difference magnitude over a row or column.

FIG. 14 depicts an example of an averaged difference magnitude over a row or column.

Plot 1400 shows peaks which at first glance appear to be a regularly-spaced pattern indicative of block noise. If the spacings between peaks in plot 1400 are closely examined, it turns out that they are either 7 or 8 pixels apart. However, there appears to be no regularity in the pattern of peak spacings.

Figure 15:
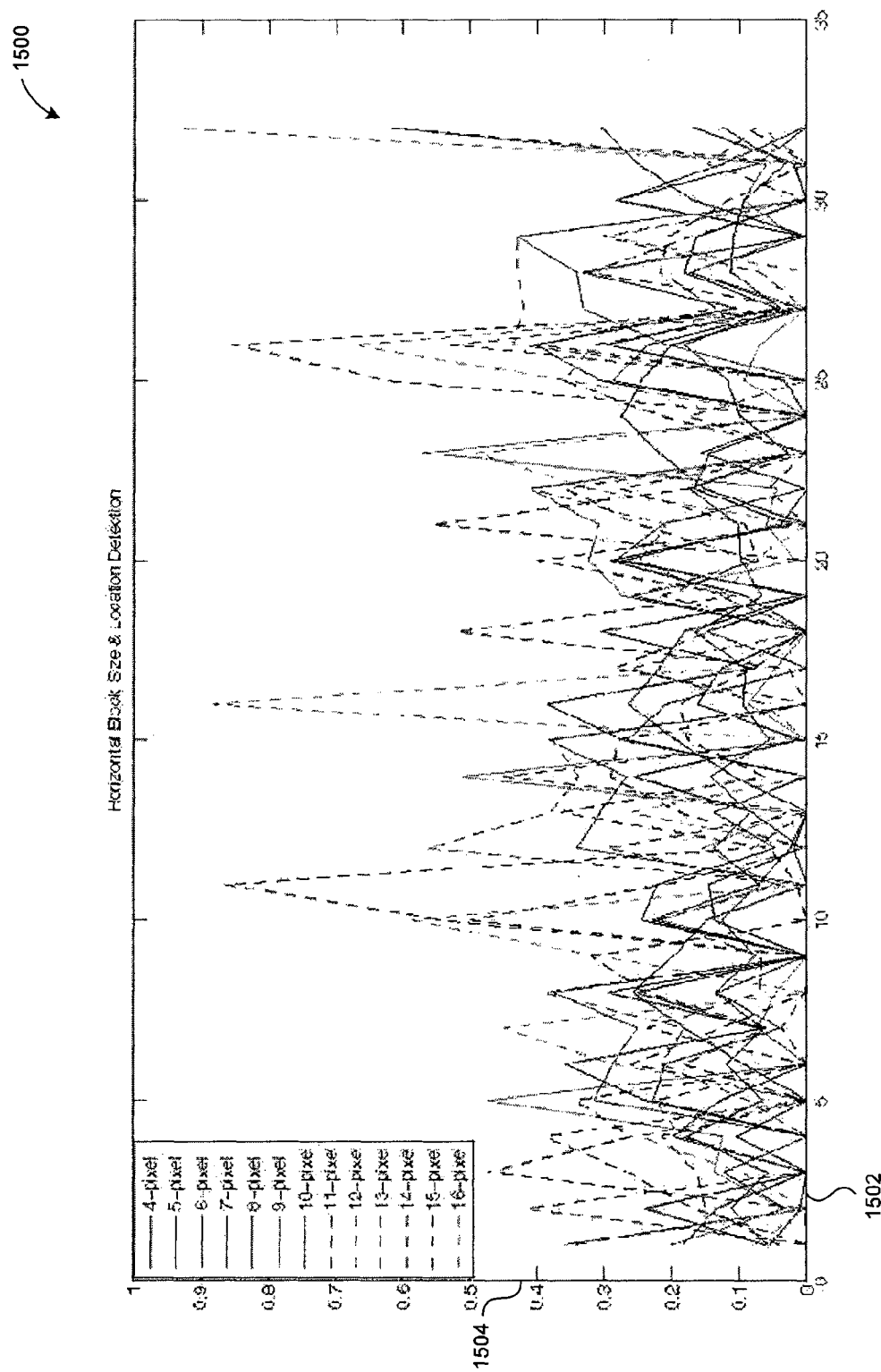
FIG. 15 depicts an example of normalized summed difference magnitudes at fixed spacings with variable offsets showing multi-pixel wide peaks.

FIG. 15 depicts an example of a plot 1500 normalized summed difference magnitudes at fixed spacings with variable offsets showing multi-pixel wide peaks for the averaged difference magnitude data shown in the example of FIG. 14.

Figure 16A:
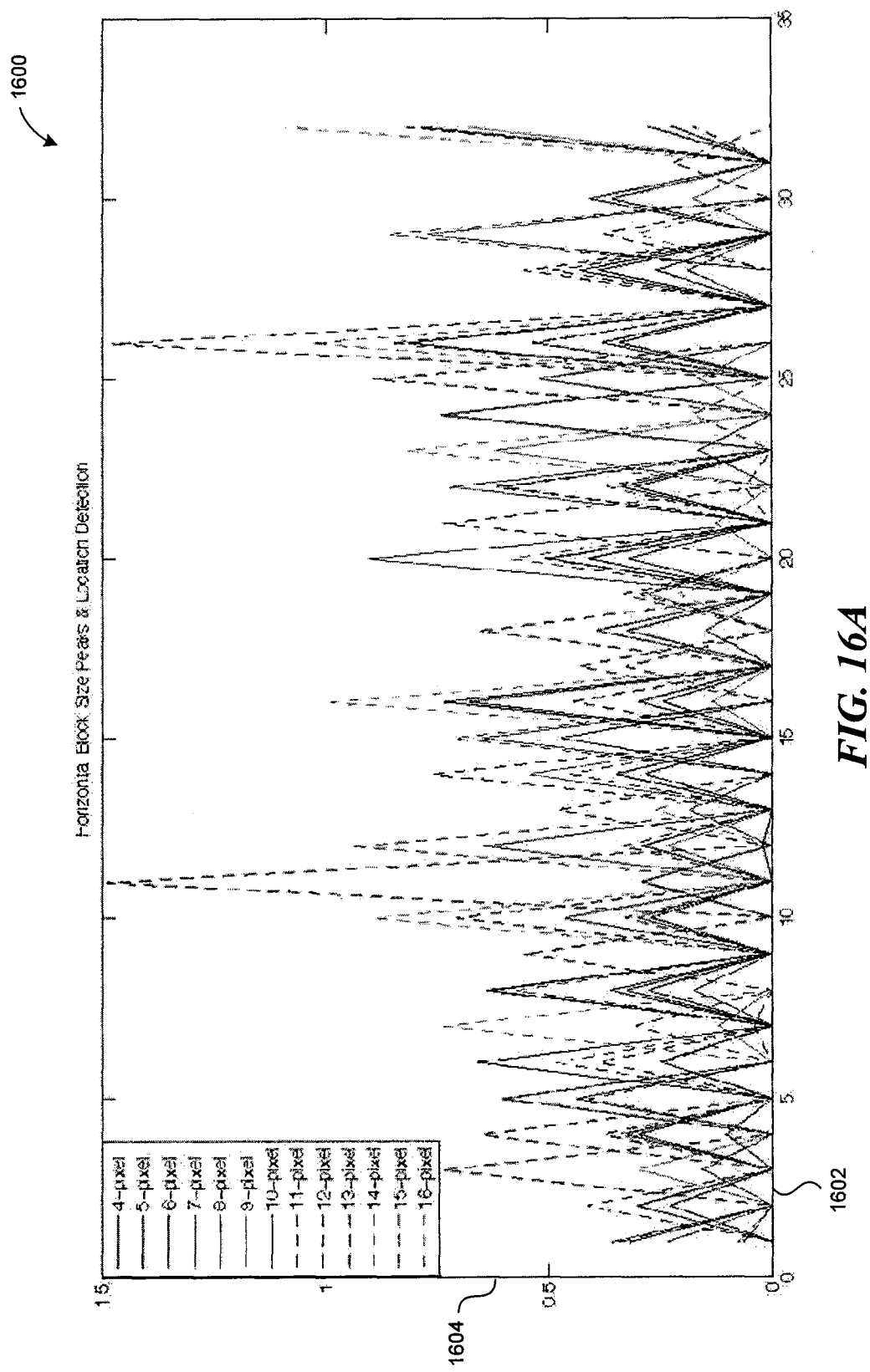
FIG. 16A depicts an example of normalized summed difference magnitudes at fixed spacings with variable offsets where adjacent non-zero interval values are summed.

Plot 1500 appears to be a mishmash of peaks and variable spacings and does not show a clear pattern. It is clear from this plot, however, that there are multi-pixel wide peaks, indicating that a consolidated peak plot should be examined. FIG. 16A depicts an example of normalized summed difference magnitudes at variable spacings with variable offsets where adjacent non-zero interval values are summed.

In plot 1600, it can be observed that there is a block size of 15, as indicated by the interval with the highest peak value and the spacing of 15 between the two highest interval peaks. However, there are several other peaks in the plot for the 15-pixel interval, and these have large enough amplitude that a block size choice of 15 is uncertain. This is borne out by the peak spacing shown in the difference magnitude plot, which clearly indicates that the block size is not 15. Also note that the interval/offset data for this example is actually better behaved than many cases, where there is often no discernible pattern at all, even after merging smeared peaks.

Consequently, another method can be used to identify the nominal block size for cases where scaling of the image results in a variable block size over the width and/or height of the image.

One key characteristic of this type of scaled image is that the block size has a nominal value, but can vary from one block to the next by ±1 pixel depending on the scaling ratio used. The variation is typically one pixel and in one direction from the nominal blocks size. Thus, in one embodiment, the summation can be performed using a single-pixel variation in interval size as the peaks are summed (e.g., via the dMag summer 406).

The summer 406 can select a starting point and then step through the difference magnitude values using a range of interval sizes (i.e., MinSize to MaxSize as in the previous interval/offset computation). The summer 406 can then sum the values found at those locations. For each interval size, the summer 406 determines a set of difference sums. For example, three different sums can be computed, one which allows for a possible offset of −1 pixel from the current interval size, one which allows no offset, and one which allows a possible offset of +1 pixel.

At each location where a value is to be added to the sum, the allowed difference magnitude values (e.g., nominal and nominal minus one for the '−1' offset) are examined and the largest one is chosen. The value at the chosen location is added to the sum for that interval. That location also becomes the starting point to which the interval size is added to determine the next location. The difference magnitude values are stepped through in this fashion for all interval sizes and for −1, 0, and +1 pixel offsets for each interval. Once the sums are computed they can be examined to determine which block size, if any, is indicated.

The following steps performed by the dMag summer 406 describe the procedure in more detail:

Horizontal Variable Interval Process

A) Identify the starting point.

1) Determine the maximum difference magnitude value in the vector. Exclude from the search points which are within 16 pixels of the edges (which are considered invalid outliers). Set a threshold value which is ¼ of the just-identified maximum.

2) Starting at an offset of the minimum block size (4), step through the values until a location is reached that is over the threshold, but not greater than the previously determined maximum (which would be deemed to be an invalid outlier). This is the first candidate start location.

3) Validate the candidate start location. It must be greater than the value to either side of it (i.e., a true peak), as well as greater than the threshold. If the current candidate is not validated, continue stepping through the values until a valid start location is found. If the start point is too far into the difference magnitude array (i.e., close to the end of the array), then the difference magnitude data does not indicate identifiable block boundaries, so set all sums to zero. The condition for this to be true is that (Width−1−MaxSize−HorizontalStartLocation) is less than or equal to zero.

B) For each interval size from MinSize to MaxSize do the following:

1) Step through the difference magnitude values beginning at the starting point by the interval value, allowing offset variations of −1, 0, and +1 for each interval. Sum the values for each interval and −1, 0, +1 offset variation. This is done as follows:

Offset Variation of −1

Step through the values using an increment of the current interval size. If the value at the nominal location is less than at the nominal location minus 1, add the value at the location minus 1 to the interval sum for the −1 offset variation, otherwise add the value at the nominal location. Use the identified maximum location as the starting point for the next step.

Offset Variation of 0

Step through the values using an increment of the current interval size. Only the value at the nominal interval size is used since the offset is zero. Use the identified location as the starting point for the next step.

Offset Variation of +1

Step through the values using an increment of the current interval size. If the value at the nominal location is less than at the nominal location plus 1, add the value at the location plus 1 to the interval sum for the +1 offset variation, otherwise add the value at the nominal location. Use the identified maximum location as the starting point for the next step.

2) Normalize each sum by dividing the sum by (Width/Interval-size).

Vertical Variable Interval Process

A) Repeat the horizontal process, but using the vertical difference magnitude vector and the image height (which is the vertical vector length) instead of the image width. For vertical block boundaries the condition for there being no valid block size due to the starting point being too close to the end of the difference magnitude vector is that (Height−1−MaxSize−VerticalStartLocation) is less than or equal to zero.

The example table of FIG. 16B indicates the results of executing this procedure on the difference magnitude data for the example used in the plots 1500 and 1600 in the examples of FIG. 15 and FIG. 16A.

The largest interval sums are found for the −1 offset of the 8-pixel interval and the +1 offset of the 7-pixel interval. These are identified as elements 1610 in the table of FIG. 16B. This type of relationship—i.e., where the sums for the −1 offset for Interval N and the +1 offset for Interval N−1 are both large and similar—indicates that the average block size of the scaled image lies between the two interval sizes. So in this example, it appears that the block size has been scaled to be between 7 and 8 pixels. In this type of case the convention is to use the lower interval as the nominal block size.

A subsequent step will indicate how this block size is used to identify specific block boundary locations (which occur at non-uniform spacings). Also note values identified as 1620, which are similar in size and structure to the values 1610, but are for interval sizes twice that of the maximums. As with the interval/offset summation method using non-variable offsets, this is a typical pattern because a 2× interval size will span the same data points which are summed to produce the maximum.

The variable-offset sums can be used by the evaluator 410 to determine block size.

One embodiment of the detector 404 includes a block size and offset evaluator 410. The block size and offset evaluator 410 can be implemented, for example, as software embodied in a computer-readable medium or computer-readable storage medium on a machine, in firmware, in hardware, in a combination thereof, or in any applicable known or convenient device or system. This and other engines described in this specification are intended to include any machine, manufacture, or composition of matter capable of carrying out at least some of the functionality described implicitly, explicitly, or inherently in this specification, and/or carrying out equivalent functionality.

The evaluator 410 can be any combination of hardware components and/or software agents able to determine block noise characteristics from difference magnitude data.

For example, the variable-offset sums of difference magnitudes generated by the summer 406 can be used by the evaluator 410 to determine block size. The evaluator 410 can perform the process for both vertical and horizontal sums and is detailed in the following example steps:

A) The first and last interval sums—i.e., the −1 offset of MinSize interval, and the +1 offset of MaxSize interval—can be effectively discarded by setting them to the adjacent value. This is done since these block sizes are outside the block size range of MinSize to MaxSize (e.g., 4:16).

B) Determine the interval size and variable-offset value which includes the maximum difference magnitude sum.

C) Check that the maximum sum is not zero. (This condition occurs when interval start location is too close to the right/bottom image edge and results in all sums being set to zero in the previous step.) If it is zero, then set the block size to zero (which indicates no valid block size found) and exit.

D) Compare the identified maximum sum to the sums for the other 2 variable offsets of the same interval.

E) Determine the block size as follows (where 'current interval' indicates the interval of the maximum):

---

IF the center (zero) offset is the maximum for its interval or if all offsets for the interval are equal THEN set the block size to half the current interval if it the current interval is even and the value of the center offset of half the current interval is very close (e.g., 7/8) to the maximum ELSE set the block size to the current interval
    ELSE the −1 offset is the maximum, so examine the next lower interval values. The +1 offset cannot be the maximum as the −1 offset of next larger interval will always be greater due to how the normalization process in the previous step is performed.
        IF the +1 offset of the next lower interval size is similar to (e.g., 15/16) or greater than the 0 and −1 offsets of that same interval, and is close to (e.g., 3/4) the +1 offset of the current interval THEN
            IF the maximum interval (N) is odd and the −1 offset of the (N+1)/2 interval is close to (e.g., 7/8) the maximum value THEN
                IF the +1 offset of the (N−1)/2 interval is close to (3/4) the −1 offset of the (N+1)/2 interval THEN
                    Set the block size to (N−1)/2
                ELSE set the block size to N−1
            ELSE IF the maximum interval (N) is even and the −1 offset of the N/2 interval is close to (7/8) the maximum value THEN
                IF the +1 offset of the (N/2)−1 interval is close to (e.g., 3/4) the −1 offset of the N/2 interval THEN
                    Set the block size to (N/2)−1
                ELSE set the block size to N−1
        ELSE set the block size to N−1
    ELSE set the block size to N

---

In one embodiment, the evaluator 410 also examines the interval/offset sums generated by the summer 406 to determine spacings between offset peaks. For example, the evaluator 410 can examine the normalized sums of difference magnitudes over various intervals and offsets to identify the highest (or near highest) amplitude peaks and the spacings between the peaks.

The evaluator 410 can use both the peak amplitude and spacing data to identify block size and offset. The following procedure is used to identify which peak amplitudes are significant and the spacing between those peaks:

A) Find the maximum peak amplitude. From this value, create a pair of threshold values—an upper threshold which is 5/8 of the maximum, and a lower threshold which is 3/8 of the maximum. Save the maximum value for later use in setting block noise filter parameters, and save the offset which contains the maximum value for use in algorithmically determining the block size and initial block boundary position.

B) For each interval size, step through the values at each offset and identify all the peaks which have values over the upper threshold and all the peaks which have values over the lower threshold.

C) For each interval size with at least one peak greater than the upper threshold, step through the offsets for the interval and identify the spacings between peaks which are over the lower threshold. The spacing between peaks is simply the difference between the offset values of those peaks. Save each spacing between overthreshold peaks to an 'offset array'.

D) Perform the above process for both the horizontal and vertical sets of the merged interval/offset values (i.e., where adjacent peaks due to image scaling have been merged into single-pixel wide peaks).

When this procedure is performed on the interval/offset data shown in the example of FIG. 10, the following peak spacings are found:

```
Maximum peak at interval: 16
Maximum peak at offset: 32
Horizontal offset spacings for interval size 8:
    8    8    8
Horizontal offset spacings for interval size 16:
    8    8    8
```

Based on this data, it is reasonably clear that the block size is 8. However, when the same procedure is performed on the interval/offset data from shown in FIG. 16A, the following is found:

```
Maximum peak at interval: 15
Maximum peak at offset: 11
Horizontal offset spacings for interval size 14:
    4    3    5    2    4    3
Horizontal offset spacings for interval size 15:
    2    6    7    8
Horizontal offset spacings for interval size 16:
    3    6    7    3    6
```

For this example, there is no clear indication of what the block size might be. There are conflicting spacings indicated among interval sizes. This type of inconclusive data is one of the reasons the variable-offset procedure is also used.

The peak spacing measurements (e.g., offset array) thus determined can be used by the evaluator 410 to determine block size and offset.

The block size is determined by both, the interval size and the spacing between peak values in the interval/offset array, while the initial offset depends on the block size and offset of the maximum peak in the interval/offset array.

The following example sequence of prioritized steps can be performed to determine the block size and offset. These steps are performed on the offset array data. The term 'MaxPeakOffset' indicates the offset of the peak with maximum amplitude using the merged-peak data set from the previous step. The same series of steps can be applied to both the horizontal and vertical offset arrays.

A) Look for the standard 8-pixel block size. The conditions for this to be true are:
  The largest interval size in the offset array with non-zero entries is 16.
  The maximum peak value occurs at an interval size which is a multiple of 8.
  There are at least 3 measured peak-to-peak spacings in one of the offset array rows.
  The first three entries in the offset array for interval size 8 are all 8.
  The first three entries in the offset array for interval size 16 are all 8.
  Set the block size to 8.
  Set the initial offset to (MaxPeakOffset mod 8)+8.

B) Look for a 4-pixel block size which appears in 4, 8, 12, and 16 interval sizes. The conditions for this to be true are:
  The largest interval size in the offset array with non-zero entries is 16.
  The maximum peak occurs at an interval size which is a multiple of 4.
  All multiple-of-4 intervals in the offset array have at least one non-zero entry.
  At least 3 of the multiple-of-4 intervals in the offset array have a mean spacing of 4.
  Set the block size to 4.
  Set the initial offset to (MaxPeakOffset mod 4)+4.

C) Look for an even-numbered interval size where half the interval size has the same peak spacing. The conditions for this to be true are:
  The interval size with the maximum difference value is even.
  All entries in the offset array for that interval size are the same.
  All entries in the offset array for that interval size are the same as those in the offset array entry for half that interval size.
  Set the block size to the peak-to-peak spacing of that interval.
  Set the initial offset to (MaxPeakOffset mod BlockSize)+BlockSize.

D) Look for a multiple-of-3 interval size where ⅔ and ⅓ the interval size have the same block size. The conditions for this to be true are:
  The interval size with the maximum difference value is a multiple of 3.
  That interval size is 12 or greater (so ⅓ of that is 4 or greater).
  All entries in the offset array for that interval size are the same.
  All entries in the offset array for that interval size are the same as those in the offset array entry for ⅔ that interval size and the same as those in the offset array entry for ⅓ that interval size.
  Set the nominal block size to the peak-to-peak spacing of that interval.
  Set the initial offset to (MaxPeakOffset mod BlockSize)+BlockSize.

E) Look for only a single interval size having non-zero measured offset(s), where that interval size is equal to the interval size containing the maximum peak value. The conditions for this to be true are:
  There is a single interval size in the offset array with a non-zero entry.
  The first entry in the offset array for that interval size is the same as the interval size.
  Set the nominal block size to that interval size.
  Set the initial offset to (MaxPeakOffset mod BlockSize)+BlockSize.

F) Look for special case of a 'macro' block of 11 with blocks of 4-4-3. This situation is found in certain cases of scaling of VCD images. The conditions for this to be true are:
  The maximum or near maximum peak occurs at an interval size of 11.
  There are more than 5 peak-to-peak spacing entries in the offset array.
  The first 6 offset array entries in the 11-pixel interval row are rotational variations of the sequence '4 4 3 4 4 3'.
  Set the block size to 4.

Set the initial offset value to the remainder after dividing the offset of the largest peak by the interval size it was found in (i.e., 11), plus the nominal block size (4) if that remainder is less than the nominal block size (4).

G) Look for special case of a 'macro' block of 16 with blocks of 5, with a peak-to-peak spacing in the offset array entries of interval 16 of 5-11 or 11-5. This case is commonly caused by downscaling 1920 to 1280 and by downscaling 1080 to 720. (I.e., three 8-pixel blocks downscaled to three blocks in a 16-pixel group.) The conditions for this to be true are:

The largest interval size in the offset array with non-zero entries is 16.
The maximum peak occurs at an interval size of 16.
There are 2 or more peak-to-peak spacing entries in the offset array.
The first 2 offset array entries in the 16-pixel interval row are 5-11 or 11-5.
Set the block size to 5.
Set the initial offset value to the remainder after dividing the offset of the largest peak by the interval size it was found in (i.e., 16), plus the nominal block size (5) if that remainder is less than the nominal block size (5).

H) Look for just a single interval size having non-zero measured offset(s).

Set the block size to the (rounded) mean of the entries in the offset array for the single interval.

The evaluator 410 can determine the initial offset value by first examining the offset entries in the merged interval/offset sums for the single interval size, and then finding the offset of the maximum-valued entry. The initial offset can then be set to the remainder after dividing that offset by the single interval size, plus the nominal block size if that remainder is less than the nominal block size.

I) Otherwise, set the block size and offset to zero (which indicates no blocks detected).

The evaluator 410 can then select the final block size and offset from those determined in the previous step by examining the entries in the offset array, and those based on the variable offset (−1/0/+1) method. If the block size determined from the entries in the offset array is zero (which indicates that no valid block size was found), then use the values determined by the variable offset method.

One special case exists for determining the vertical block size and offset. If the vertical block size determined from the entries in the offset array is 2, then the original image data is almost certainly a weave of two interlaced fields which have a temporal difference between them (e.g., they are not from the same point in time). When this is the case then set the block size to zero (indicating no valid block size).

One embodiment of the detector 404 includes a boundary map generator 412. The boundary map generator 412 can be implemented, for example, as software embodied in a computer-readable medium or computer-readable storage medium on a machine, in firmware, in hardware, in a combination thereof, or in any applicable known or convenient device or system. This and other engines described in this specification are intended to include any machine, manufacture, or composition of matter capable of carrying out at least some of the functionality described implicitly, explicitly, or inherently in this specification, and/or carrying out equivalent functionality.

The boundary map generator 412 can be any combination of hardware components and/or software agents able to generate a map of block boundaries using nominal block sizes and starting block boundary locations.

The generator 412 can determine luma block boundaries based on the spacing of peaks in the difference magnitude vectors. The procedure used can start at the already-determined location of the first block boundary, and then step through the difference magnitude data by the nominal block size. At each step, a small window is searched for the maximum peak location, which is then marked as a block boundary. That location is made the starting point for the next search, and the process continues to the end of the data.

The generator 412 can create a block boundary map which includes the location of block boundaries identified during this process. The boundary map is a vector the same size as the difference magnitude vector. The boundary map entries are tri-valued, with 0 denoting no block boundary is present at a location, 1 denoting that a block boundary is present at a location, and a value of ½ indicating that a secondary boundary feature is present. Secondary boundary features include smeared boundaries due to scaling and indicate that a boundary is therefore more than one pixel wide.

The following procedure provides more details on how this is performed. Note that the block boundary map can be initialized to all zeros before the procedure, and that the default search window for each step of the process is ±2 pixels. This procedure is the same for both horizontal and vertical luma block boundary maps.

A) First, check if the block size is 0. If so, then there are no block noise boundaries found and the boundary map remains all zeros.

B) The location of first boundary is set to the initial offset value. The boundary map value for this location is set to the maximum value of 1.0. This also becomes the baseline for the first peak search.

C) Look for 'double wide peaks' at the starting location which are caused by scaling. If either of the locations adjacent to the starting location is larger than the magnitude of the starting location, then set the value of that adjacent block boundary map location to 1.0. Otherwise, if either of the locations adjacent to the starting location is larger than ⅒ the magnitude of the starting location, then set the value of the block boundary map to 0.5.

D) Step through the difference magnitude data looking for peaks in a window around each candidate block boundary location as follows:

Add the nominal block size to the baseline to determine the center location of the window for a new peak search.

Identify the location of the maximum value (i.e., the peak) within the search window.

IF the magnitude of the newly identified peak is greater than ⅕ of the peak magnitude at the previous location THEN
  Set this location in the block boundary map to 1.0.
  Mark this as the current peak and the baseline for the next search.
  Look for 'double wide peaks' at the starting location which are caused by scaling. If either of the locations adjacent to the starting location is larger than ⅒ the magnitude of the starting location, then set the value of the block boundary map for that location to 0.5.

ELSE IF the magnitude of the newly identified peak is greater than 1/20 of the previous peak and the magnitude at the next higher location is less than 4× the new peak magnitude (Note: this eliminates peak locations which are not true peaks but are just at the limit of the search window.) THEN
  Do not change this location in the block boundary location array, but do set this as the baseline for the next search.

ELSE use the previous baseline plus the nominal block size as the baseline for the next search.

Repeat the above sequence of steps until the end of the difference magnitude vector is reached.

The generator 412 can also generate a map for the chroma. The procedure for creating the chroma block boundary map is similar to that for the luma map. The differences are that the chroma difference magnitude data is used instead of luma, and the chroma block boundary map allows for dual separated peaks due to the possibility of chroma up-sampling followed by image scaling. The following example of a modified procedure can therefore be used:

A) First, check if the block size is 0. If so, then there are no block noise boundaries found and the boundary map remains all zeros.

B) The location of first boundary can be set to the initial offset value. The boundary map value for this location is set to the maximum value of 1.0. This also becomes the baseline for the first peak search.

C) Look for 'double wide peaks' at the starting location which are caused by scaling. If either of the locations adjacent to the starting location is larger than the magnitude of the starting location, then set the value of that adjacent block boundary map location to 1.0. Otherwise, if either of the locations adjacent to the starting location is larger than $\frac{1}{10}$ the magnitude of the starting location, then set the value of the block boundary map to 0.5.

D) Step through the difference magnitude data looking for peaks in a window around each candidate block boundary location as follows:

Add the nominal block size to the baseline to determine the center location of the window for a new peak search.

Identify the location of the maximum value (i.e., the peak) within the search window.

IF the magnitude of the newly identified peak is greater than $\frac{1}{5}$ of the peak magnitude at the previous location THEN Set this location in the block boundary map to 1.0.

Mark this as the current peak and the baseline for the next search.

Look for 'double wide peaks' and 'double separated peaks' at the starting location which are caused by scaling. If either of the locations immediately adjacent to the starting location is larger than $\frac{1}{10}$ the magnitude of the starting location, then set the value of the block boundary map for that location to 0.5. If an immediately adjacent location does not have a valid value, then check the adjacent locations 2 pixels from the center, using the same criteria for changing a boundary map value.

Disqualify multiple double-peak selections:

IF there are multiple separated peaks, then choose the largest of the two

ELSE IF there is a separated peak on left and a connected peak on right, choose the larger.

ELSE IF there is a separated peak on right and connected peak on left, choose the larger.

ELSE IF the magnitude of the newly identified peak is greater than $\frac{1}{20}$ of the previous peak and the magnitude at the next higher location is less than 4× the new peak magnitude (Note: this eliminates peak locations which are not true peaks but are just at the limit of the search window.) THEN Do not change this location in the block boundary location array, but do set this as the baseline for the next search.

ELSE use the previous baseline plus the nominal block size as the baseline for the next search.

Repeat the above sequence of steps until the end of the difference magnitude vector is reached.

One embodiment of the detector 404 includes a filter gain generator 414. The filter gain generator 414 can be implemented, for example, as software embodied in a computer-readable medium or computer-readable storage medium on a machine, in firmware, in hardware, in a combination thereof, or in any applicable known or convenient device or system. This and other engines described in this specification are intended to include any machine, manufacture, or composition of matter capable of carrying out at least some of the functionality described implicitly, explicitly, or inherently in this specification, and/or carrying out equivalent functionality.

The filter gain generator 414 can be any combination of hardware components and/or software agents able to compute, determine, generate filter gain values for a block noise filter.

The filter gain generator 414 can compute the filter gain by starting at a baseline value and modifying that based on a number of calculated 'modifiers'. These modifiers are based on the factors listed below, and can be added to the baseline gain to determine a final gain value. In general, separate modifier values can be calculated for horizontal and vertical filter gain. The following can be used as factors in the gain calculation:

Nominal gain is 1.0

Block boundary strength (BBS) increases gain

Low detail (summed difference magnitude) increases gain

Larger block size increases gain

Block boundary strength below 1.0 rapidly decreases gain

Count of intervals over the threshold along with block boundary strength can determine if block noise is even present—i.e., gain can be set to zero if it is deemed there is no significant block noise.

Once the modifiers have been all been calculated, they can be consolidated with the baseline gain values to produce the horizontal and vertical filter gains. The first step is to identify conditions which indicate that there is no block noise present. If those conditions are not present, the various gain modifiers are added to the baseline gain value and the result is limited to upper and lower bounds (2.3 and 0, respectively). Then, for the special case where the effects of the gain modifiers result in zero gain, and where the magnitude of the image detail modifier constitutes the majority of the total effects of the modifiers, then the filter gain is set to 1.0. This is intended to recognize instances where high image detail by itself forces the filter gain to zero.

Once both horizontal and vertical gains have been calculated, one more special condition is looked for. Both vertical and horizontal filter gains are set to zero if the following conditions are met:

1) Block size determination via interval/offset method is zero for both horizontal and vertical.

2) One of the filter gains is zero, or both are very low (where low=0.25).

One embodiment of the detector 404 includes an edge gradient multiplier generator 416. The edge gradient multiplier generator 416 can be implemented, for example, as software embodied in a computer-readable medium or computer-readable storage medium on a machine, in firmware, in hardware, in a combination thereof, or in any applicable known or convenient device or system. This and other engines described in this specification are intended to include any machine, manufacture, or composition of matter capable of carrying out at least some of the functionality described implicitly, explicitly, or inherently in this specification, and/or carrying out equivalent functionality.

The edge gradient multiplier generator 416 can be any combination of hardware components and/or software agents able to compute, determine, and/or generate an edge gradient multiplier for the block noise filter, the components and functionalities of which are described with further reference to the example of FIG. 5. In one embodiment, the filter gain generator 414 and/or edge gradient multiplier generator are components of the filter control parameter generator 420.

The edge gradient multiplier generator 416 can determine the edge gradient multiplier by starting at a baseline value and modifying that based on a pair of calculated 'modifiers'. These modifiers can be determined based on, for example, the block strength and level of detail in the image, and are added to the baseline gradient multiplier to result in a final gradient multiplier value. Separate modifier values are calculated for horizontal and vertical filter gain. The following can be used as factors in the gradient multiplier calculation:

Nominal multiplier is 2.0
High block boundary strength decreases multiplier; very low block boundary strength increases the multiplier
High detail increases multiplier Once the modifiers have been all been calculated, the generator 416 can consolidated the baseline gradient multiplier value to produce the horizontal and vertical gradient multipliers. The two modifiers can be added to the baseline gradient multiplier value and the result is limited to a lower bound of 1.0.

FIG. 5 depicts a block diagram illustrating an example of the components in a block noise filter 554.

The next stage in the processing of block noise is to filter out the block noise boundaries. To do this effectively, the block noise filter can be configured appropriately based on the characteristics of the block noise in the image. Control inputs to the filter include, for example, the luma and/or chroma boundary maps (determined by the block noise detector in the example of FIG. 4), vertical and horizontal filter gain values, and vertical and horizontal edge strength multipliers (e.g., edge gradient multipliers). The filter input manager 502 can compute or manage these inputs to the filter 554. These latter values are can be determined automatically based on factors including, for example:

Block detection strength (peak difference magnitude value)
Block size
Level of detail in the image (normalized sum of difference magnitude values over the entire image)
Number of intervals which have magnitudes over a threshold.

The protocol for calculating the filter control values can be based on empirical data from analysis of multiple image types.

The filter input manager 502 can compute or manage the following inputs to the filter 554.

Horizontal Luma Block Boundary Map:
Map of horizontal luma block boundary locations. This is an array which is width of the input image, with entries indicating primary and secondary boundaries.

Vertical Luma Block Boundary Map:
Map of vertical luma block boundary locations. This is an array which is width of the input image, with entries indicating primary and secondary boundaries.

Horizontal Chroma Block Boundary Map:
Map of horizontal chroma block boundary locations. This is an array which is width of the input image, with entries indicating primary and secondary boundaries.

Vertical Chroma Block Boundary Map:
Map of vertical chroma block boundary locations. This is an array which is width of the input image, with entries indicating primary and secondary boundaries.

Horizontal Filter Gain:
Gain value for horizontal filter. The gain value affects the selection of horizontal filter coefficients and the width of the filter.

Vertical Filter Gain:
Gain value for vertical filter. The gain value affects the selection of vertical filter coefficients and the height of the filter.

Horizontal Gradient Multiplier:
The horizontal gradient is used to suppress filtering at horizontal image feature edges. The gradient multiplier affects the degree to which the suppression is performed.

Vertical Gradient Multiplier:
The vertical gradient is used to suppress filtering at vertical image feature edges. The gradient multiplier affects the degree to which the suppression is performed.

One embodiment of the block noise filter 554 includes an image gradient generator 504. The image gradient generator 504 can be implemented, for example, as software embodied in a computer-readable medium or computer-readable storage medium on a machine, in firmware, in hardware, in a combination thereof, or in any applicable known or convenient device or system. This and other engines described in this specification are intended to include any machine, manufacture, or composition of matter capable of carrying out at least some of the functionality described implicitly, explicitly, or inherently in this specification, and/or carrying out equivalent functionality.

The image gradient generator 504 can be any combination of hardware components and/or software agents able to compute, determine, and/or generate gradients in an image.

Image gradients can be used to suppress artifacts along the edges of objects in the image. The gradients are calculated with luma pixel data using 5×5 Sobel filters. The Sobel filters are, for example, defined to be:

$$HorSobelFilter 5 \times 5 = \begin{bmatrix} -1 & 0 & 0 & 0 & 1 \\ -2 & 0 & 0 & 0 & 2 \\ -4 & 0 & 0 & 0 & 4 \\ -2 & 0 & 0 & 0 & 2 \\ -1 & 0 & 0 & 0 & 1 \end{bmatrix};$$

$$VertSobelFilter 5 \times 5 = \begin{bmatrix} 1 & 2 & 4 & 2 & 1 \\ 0 & 0 & 0 & 0 & 0 \\ 0 & 0 & 0 & 0 & 0 \\ 0 & 0 & 0 & 0 & 0 \\ -1 & -2 & -4 & -2 & -1 \end{bmatrix};$$

(Note that the output of the filters are normalized by dividing by 10.)

A 2-dimensional Gaussian filter can first be applied to the luma data, and then the Sobel filters are applied to generate the vertical and horizontal image gradients. The absolute value of the result can be taken to produce the vertical and horizontal gradient magnitudes.

One embodiment of the block noise filter 554 includes a vertical filter 506. The vertical filter 506 can be implemented, example, as software embodied in a computer-readable medium or computer-readable storage medium on a machine, in firmware, in hardware, in a combination thereof, or in any applicable known or convenient device or system. This and other engines described in this specification are intended to include any machine, manufacture, or composition of matter capable of carrying out at least some of the functionality described implicitly, explicitly, or inherently in this specification, and/or carrying out equivalent functionality.

The vertical filter 506 can be any combination of hardware components and/or software agents able to filter an image along the vertical dimension.

The vertical filter 506 can filter the image along the vertical dimension based on one or more of, the block boundary map, filter gain, and/or gradient multiplier input values. The filter distributes the Y, Cb and Cr vertical differences at the block boundary locations indicated by the vertical block boundary map across a portion of the height of the blocks adjacent to the boundary.

The filter 506 can determine the coefficients for the vertical luma filter based on the vertical filter gain factor. The luma filter is composed of, for example, 3 coefficients which are mirrored on each side of the block boundary location. More or less coefficients could be used a well. Additional coefficients could generate better results. The following equations illustrate and example of how the filter coefficients can be calculated:

```
if (FilterGain > 1.0) then
        LCoefficient1 = (5 + ((FilterGain−1) * 1.5)) / 16;
        LCoefficient2 = (2 + ((FilterGain−1) * 2.0)) / 16;
        LCoefficient3 = ( (FilterGain−1) * 2.0) / 16;
else
        LCoefficient1 = (5 + ((FilterGain−1) * 5)) / 16;
        LCoefficient2 = (2 + ((FilterGain−1) * 2)) / 16;
        LCoefficient3 = 0;
end if
```

The filter can be applied at locations with a peak in the luma block boundary map. If adjacent locations in the boundary map have equal non-zero amplitudes, the one with the highest (or near-highest) index can be chosen as the location of the center peak.

In one embodiment, three luma-difference values are computed, which are each then multiplied by the set of filter coefficients. The first difference value can be determined based on the difference between adjacent pixels at the center peak location. The remaining two difference values can be computed based on the first calculated difference value, the difference between adjacent pixel values at each adjacent location, and the block boundary map magnitude value for the adjacent locations.

The center block boundary difference value is the difference between the pixel value at the center location and the pixel value at the next higher location. The adjacent values can be determined based, first of all, on whether the boundary map value for each adjacent location is zero. If so, then the value of the adjacent difference value is also zero. Otherwise, the adjacent value is the minimum (or near minimum) of the center difference value and the magnitude of the adjacent pixel difference value, multiplied by the sign (±1) of the adjacent pixel difference value.

If the center pixel is at location N, then the following equations describe an example of how each of the three difference values are calculated (where 'Diff1' is at the center location while 'Diff0' and 'Diff2' are the locations before and after the center, respectively):

```
Diff1 = LumaImage(N) − LumaImage(N+1);
Diff0Temp = LumaImage(N−1) − LumaImage(N);
Diff2Temp = LumaImage(N+1) − LumaImage(N+2);
if (LumaVerticalBlockBoundaryMap(N−1) > 0) then
        Diff0 = min(abs(Diff1), abs(Diff0Temp)) * sign(Diff0Temp);
else
        Diff0 = 0;
end if
if (LumaVerticalBlockBoundaryMap(N+1) > 0) then
        Diff2 = min(abs(Diff1), abs(Diff2Temp)) * sign(Diff2Temp);
else
        Diff2 = 0;
end if
```

The vertical filter 506 can then be applied to the image using the calculated filter coefficients and the block boundary difference values for each pixel location. For each pixel which is located within a ±4 pixel neighborhood of the block boundary peak location and in a direction perpendicular to the boundary, it computes the effects of the filter and modifies the pixel value based on the filter calculations. The following equations indicate an example of how the filter calculations are made, assuming N is the pixel location just before (above) the block boundary (which is assumed to be located between two pixels). The calculations are for a single column of pixels orthogonal to the boundary.

$FilteredImage(N-3) = OriginalImage(N-3) - (Diff0 * LCoefficient3);$ $FilteredImage(N-2) =$ $\quad OriginalImage(N-2) - (Diff0 * LCoefficient2) - (Diff1 * LCoefficient3);$ $FilteredImage(N-1) = OriginalImage(N-1) - (Diff0 * LCoefficient1) -$ $\quad (Diff1 * LCoefficient2) - (Diff2 * (LCoefficient2/4));$ $FilteredImage(N) = OriginalImage(N) - (Diff0 * -LCoefficient1) -$ $\quad (Diff1 * LCoefficient1) - (Diff2 * (LCoefficient1/2));$ $FilteredImage(N+1) = OriginalImage(N+1) +$ $\quad (Diff0 * (LCoefficient1/2)) +$ $\quad (Diff1 * LCoefficient1) + (Diff2 * -LCoefficient1);$ $FilteredImage(N+2) = OriginalImage(N+2) +$ $\quad (Diff0 * (LCoefficient2/4)) +$ $\quad (Diff1 * LCoefficient2) + (Diff2 * LCoefficient1);$ $FilteredImage(N+3) = OriginalImage(N+3) +$ $\quad (Diff1 * LCoefficient3) + (Diff2 * LCoefficient2);$ $FilteredImage(N+4) = OriginalImage(N+4) + (Diff2 * LCoefficient3);$ In one embodiment, the vertical filter 506 computes the coefficients for the vertical chroma, for example, based on the vertical filter gain factor. Chroma is typically filtered more heavily than luma since the chroma bandwidth is typically lower and the block size is typically larger. The chroma filter may be composed of up to 4 coefficients which are mirrored on each side of the block boundary location. More or less coefficients could be used a well. Additional coefficients could generate better results. The chroma filter has more coefficients since chroma blocks are typically larger than luma blocks and consequently need a larger filter to be effectively smoothed out. Also, the smeared block boundaries for chroma can span 2 pixels instead of 1 for luma. The following equations describe an example of how the filter coefficients can be calculated:

```
        FilterGain = min(VerticalFilterGain * 1.25,2.5);
        if (FilterGain > 1.0) then
                CCoefficient1 = (5 + ((FilterGain-1) * 1.5)) / 16;
                CCoefficient2 = (2 + ((FilterGain-1) * 2.0)) / 16;
                CCoefficient3 = ( (FilterGain-0.5) * 1.5) / 16;
                CCoefficient4 = ( (FilterGain-1) * 0.875) / 16;
        elseif (FilterGain < 0.5) then
                CCoefficient1 = (5 + ((FilterGain-1) * 5)) / 16;
                CCoefficient2 = (2 + ((FilterGain-1) * 2)) / 16;
                CCoefficient3 = 0;
                CCoefficient4 = 0;
        else
                CCoefficient1 = (5 + ((FilterGain-1) * 5)) / 16;
                CCoefficient2 = (2 + ((FilterGain-1) * 2)) / 16;
                CCoefficient3 = ( (FilterGain-0.5) * 1.5) / 16;
                CCoefficient4 = 0;
        end if
```

The vertical filter 506 can be applied at locations with a peak in the chroma block boundary map. If adjacent locations in the boundary map have equal non-zero amplitudes, the one with the highest index is chosen as the location of the center peak. The chroma block boundary map is used for both Cb and Cr, and the filter is implemented identically for both.

Difference values are computed for chroma the same way that they are for luma, with the exception that five difference values are used instead of the three used for luma. A larger number of difference values are typically used for two reasons:

1) The chroma filter spans a larger number of pixel locations since chroma blocks are typically larger than luma blocks.

2) The chroma filter allows non-contiguous adjacent block boundary values to account for scaling of up-sampled chroma.

If the center pixel is at location N, then the following equations describe an example of how each of the five difference values are calculated (where 'Diff2' is at the center location and the other 'Diff' values are the locations adjacent to the center):

```
Diff2 = ChromaImage(N) - ChromaImage(N+1);
Diff0Temp = ChromaImage(N-2) - ChromaImage(N-1);
Diff1Temp = ChromaImage(N-1) - ChromaImage(N);
Diff3Temp = ChromaImage(N+1) - ChromaImage(N+2);
Diff4Temp = ChromaImage(N+2) - ChromaImage(N+3);
if (ChromaVerticalBlockBoundaryMap(N-2) > 0) then
        Diff0 = min(abs(Diff2), abs(Diff0Temp)) * sign(Diff0Temp);
else
        Diff0 = 0;
end if
if (ChromaVerticalBlockBoundaryMap(N-1) > 0) then
        Diff1 = min(abs(Diff2), abs(Diff1Temp)) * sign(Diff1Temp);
else
        Diff1 = 0;
end if
if (ChromaVerticalBlockBoundaryMap(N+1) > 0) then
        Diff3 = min(abs(Diff2), abs(Diff3Temp)) * sign(Diff3Temp);
else
        Diff3 = 0;
end if
if (ChromaVerticalBlockBoundaryMap(N+2) > 0) then
        Diff4 = min(abs(Diff2), abs(Diff4Temp)) * sign(Diff4Temp);
else
        Diff4 = 0;
end if
```

The filter itself is then applied to the image using the calculated filter coefficients and the block boundary difference values for each pixel location. For each pixel which is located within a ±6 pixel neighborhood of the block boundary peak location and in a direction perpendicular to the boundary, it computes the effects of the filter and modifies the pixel values based on the filter calculations.

The following equations indicate an example of how the filter calculations are performed, assuming N is the pixel location just before (above) the block boundary (which is assumed to be located between two pixels). The calculations are for a single column along the boundary. There are two separate types of filter calculations, one which is used when there are no separated peaks in the block boundary map (i.e., 'adjacent' values are only one pixel location away from the center peak), and another when there is at least one separated peak (i.e, an 'adjacent' value is two pixel locations from the center peak).

The following equations are used when no separated, double peaks are present:

$$FilteredImage(N-4) = OriginalImage(N-4) - (Diff1 * CCoefficient4);$$

$$FilteredImage(N-3) = OriginalImage(N-3) -$$
$$(Diff1 * CCoefficient3) - (Diff2 * CCoefficient4);$$

$$FilteredImage(N-2) = OriginalImage(N-2) -$$
$$(Diff1 * CCoefficient2) - (Diff2 * CCoefficient3);$$

$$FilteredImage(N-1) = OriginalImage(N-1) - (Diff1 * CCoefficient1) -$$
$$(Diff2 * CCoefficient2) - Diff3 * (CCoefficient2 / 4));$$

$$FilteredImage(N-0) = OriginalImage(N-0) - (Diff1 * -CCoefficient1) -$$
$$(Diff2 * CCoefficient1) - (Diff3 * (CCoefficient1 / 2));$$

$$FilteredImage(N+1) = OriginalImage(N+1) +$$
$$(Diff1 * (CCoefficient1 / 2)) +$$
$$(Diff2 * CCoefficient1) + (Diff3 * -CCoefficient1);$$

$$FilteredImage(N+2) = OriginalImage(N+2) +$$
$$(Diff1 * (CCoefficient2 / 4)) +$$
$$(Diff2 * CCoefficient2) + (Diff3 * CCoefficient1);$$

$$FilteredImage(N+3) = OriginalImage(N+3) +$$
$$(Diff2 * CCoefficient3) + (Diff3 * CCoefficient2);$$

$$FilteredImage(N+4) = OriginalImage(N+4) +$$
$$(Diff2 * CCoefficient4) + (Diff3 * CCoefficient3);$$

$$FilteredImage(N+5) = OriginalImage(N+5) + (Diff3 * CCoefficient4);$$

The following equations are used when a separated, double peak is present:

$$FilteredImage(N-5) = OriginalImage(N-5) - (Diff0. * CCoefficient4);$$

$$FilteredImage(N-4) = OriginalImage(N-4) - (Diff0. * CCoefficient3);$$

$$FilteredImage(N-3) = OriginalImage(N-3) -$$
$$(Diff0. * CCoefficient2) - (Diff2. * CCoefficient4);$$

$$FilteredImage(N-2) = OriginalImage(N-2) -$$
$$(Diff0. * CCoefficient1) - (Diff2. * CCoefficient3);$$

$$FilteredImage(N-1) = OriginalImage(N-1) + (Diff0. * CCoefficient1) -$$
$$(Diff2. * CCoefficient2) - (Diff4. * CCoefficient4);$$

$$FilteredImage(N) = OriginalImage(N) + (Diff0. * CCoefficient2) -$$
$$(Diff2. * CCoefficient1) - (Diff4. * CCoefficient3);$$

-continued $$FilteredImage(N+1) = OriginalImage(N+1) + (Diff0 * CCoefficient3) +$$
$$(Diff2 * CCoefficient1) - (Diff4 * CCoefficient2);$$
$$FilteredImage(N+2) = OriginalImage(N+2) + (Diff0 * CCoefficient4) +$$
$$(Diff2 * CCoefficient2) - (Diff4 * CCoefficient1);$$
$$FilteredImage(N+3) = OriginalImage(N+3) +$$
$$(Diff2 * CCoefficient3) + (Diff4 * CCoefficient1);$$
$$FilteredImage(N+4) = OriginalImage(N+4) +$$
$$(Diff2 * CCoefficient4) + (Diff4 * CCoefficient2);$$
$$FilteredImage(N+5) = OriginalImage(N+5) + (Diff4 * CCoefficient3);$$
$$FilteredImage(N+6) = OriginalImage(N+6) + (Diff4 * CCoefficient4);$$

One embodiment of the block noise filter 554 includes a horizontal filter 510. The horizontal filter 510 can be implemented, for example, as software embodied in a computer-readable medium or computer-readable storage medium on a machine, in firmware, in hardware, in a combination thereof, or in any applicable known or convenient device or system. This and other engines described in this specification are intended to include any machine, manufacture, or composition of matter capable of carrying out at least some of the functionality described implicitly, explicitly, or inherently in this specification, and/or carrying out equivalent functionality.

The horizontal filter 510 can be any combination of hardware components and/or software agents able to filter an image along the horizontal dimension.

In one embodiment, the horizontal filter 510 filters the vertically-filtered image along the horizontal dimension based on the horizontal block boundary map, filter gain, and gradient multiplier input values. The filter distributes the Y, Cb and Cr horizontal differences at the block boundary locations specified by the horizontal block boundary map across a portion of the width of the blocks adjacent to the boundary.

The horizontal filter 510 can be implemented similarly to the vertical filter, with the differences being that it is applied to the output of the vertical filter instead of the original image, and that it is applied in the horizontal direction at the locations specified by the horizontal block boundary map.

After the filtering for each horizontal block boundary location is completed, the vertically filtered image and the original image can be blended, for example, by the edge blender 508 based on the vertical gradient magnitude value. The output can be sent to the horizontal filter. The blender 508 can blend the vertically filtered image and the horizontally filtered image using the horizontal gradient of the input image. In one embodiment, the edge blender 508 generates a blend factor based on the magnitude of the horizontal image gradient multiplied times the horizontal gradient multiplier. The resulting blend map values over 1 can be clipped to 1. The blend map and blended image can then be computed in a fashion similar to that used for the vertically filtered image.

One embodiment of the block noise filter 554 includes an edge smoother 512. The edge smoother 512 can be implemented, for example, as software embodied in a computer-readable medium or computer-readable storage medium on a machine, in firmware, in hardware, in a combination thereof, or in any applicable known or convenient device or system. This and other engines described in this specification are intended to include any machine, manufacture, or composition of matter capable of carrying out at least some of the functionality described implicitly, explicitly, or inherently in this specification, and/or carrying out equivalent functionality.

The edge smoother 512 can be any combination of hardware components and/or software agents able to remove block boundary and/or filter artifacts. The edge smoother may be implemented as described in co-pending U.S. patent application Ser. No. 12/204,760, entitled "SYSTEM, METHOD, AND APPARATUS FOR SMOOTHING OF EDGES IN IMAGES TO REMOVE IRREGULARITIES", filed Sep. 4, 2008, the contents of which is incorporated by reference herein.

In one embodiment, the edge smoother 512 performs edge smoothing on the resulting image to remove block boundary and filter artifacts along object edges in the image. Any suitable edge smoothing filter may be used. The filter kernel size can be determined based on the block filter gain values. In one embodiment, if both the vertical and horizontal filter gain values are zero, then the edge-smoothing step is skipped. If both gain values are less than 2, then the small filter kernel is used. Otherwise, the large edge-smoothing filter kernel is used.

Figure 17:
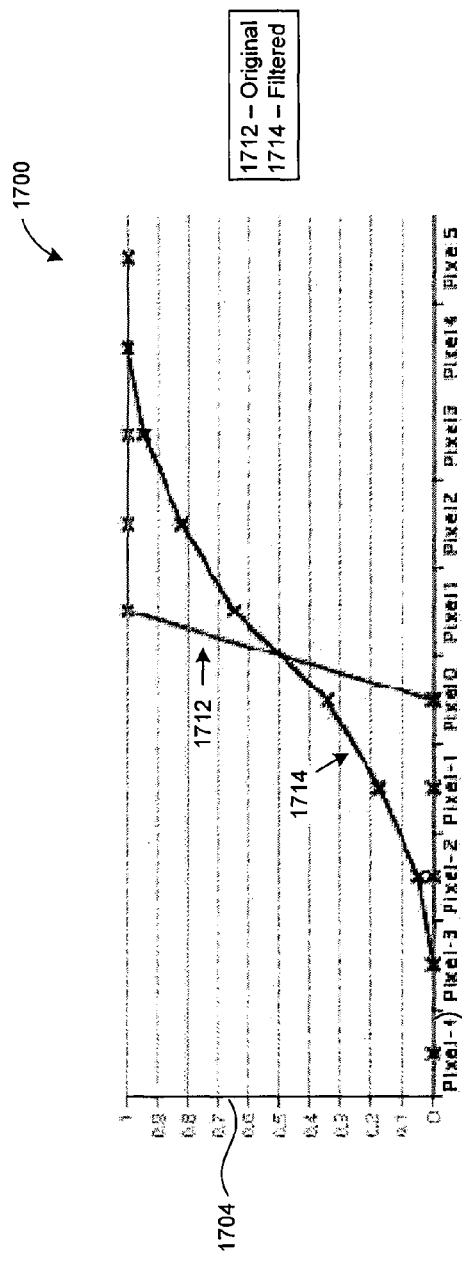
FIG. 17-18 depict examples of effects of applying a block noise filter to a noise boundary with and without the effects of scaling.
Figure 18:
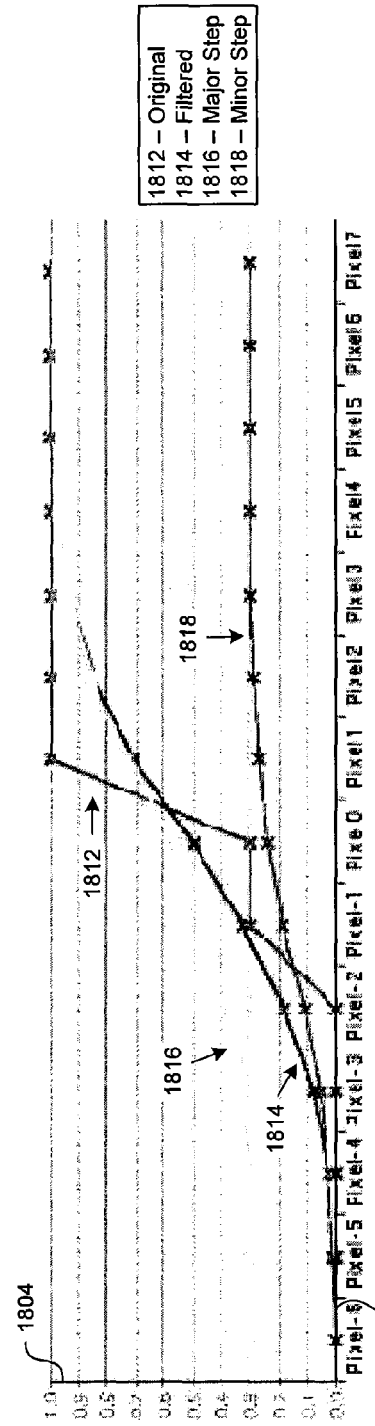

FIG. 17-18 depict examples of effects of applying a block noise filter to a noise boundary with and without the effects of scaling.

The block noise filter reduces block noise by distributing the difference across the boundary between adjacent blocks among pixels which are adjacent to and perpendicular to the boundary. The filter coefficients are based on the filter gain values which are control inputs to the filter. The filter location is determined by input block boundary maps, where a block boundary is specified to be located between 2 pixel locations.

An example of the effects of the filter is shown in the example of FIG. 17. The figure plots the magnitude of a video signal across a hypothetical block boundary located between 'Pixel 0' and 'Pixel 1', where the level of the left block is 0 and the right block is 1. The red line in the plot is the original, pre-filtered signal. The filter operates to distribute the difference between the left and right blocks (i.e., the large step in the original signal from 0 to 1) among pixels adjacent to the block boundary. The blue line is the filtered result.

The filter can also handle the effects of scaling on the block boundaries. This is illustrated in the example of FIG. 18, which shows a signal which has been scaled twice. This example simulates a chroma signal which has first been upsampled from 4:2:0 to 4:4:4, and then scaled to a different resolution. This creates a 2-pixel wide shelf (i.e., Pixel −1 and Pixel 0 in the red line of the figure) in the pixels in the neighborhood of the block boundary. As a result, there are 2 steps in the pixel values as they traverse from left to right across the block boundary—a minor one on the left between Pixel −2 and Pixel −1, and a larger, primary step on the right between Pixel 0 and Pixel 1. The original signal is shown in red, with the final filtered result shown in blue. The effects on the overall filter of the minor and major steps are shown in brown and yellow, respectively. The overall filter response is the sum of the responses for the two steps.

After the filter is applied, an edge-blending operation can be performed with the filtered and unfiltered images, where the degree of blending is determined by gradient multipliers control inputs. In some instances, an edge-smoothing function is applied to remove block noise and filter artifacts along object edges in the image.

Figure 19:
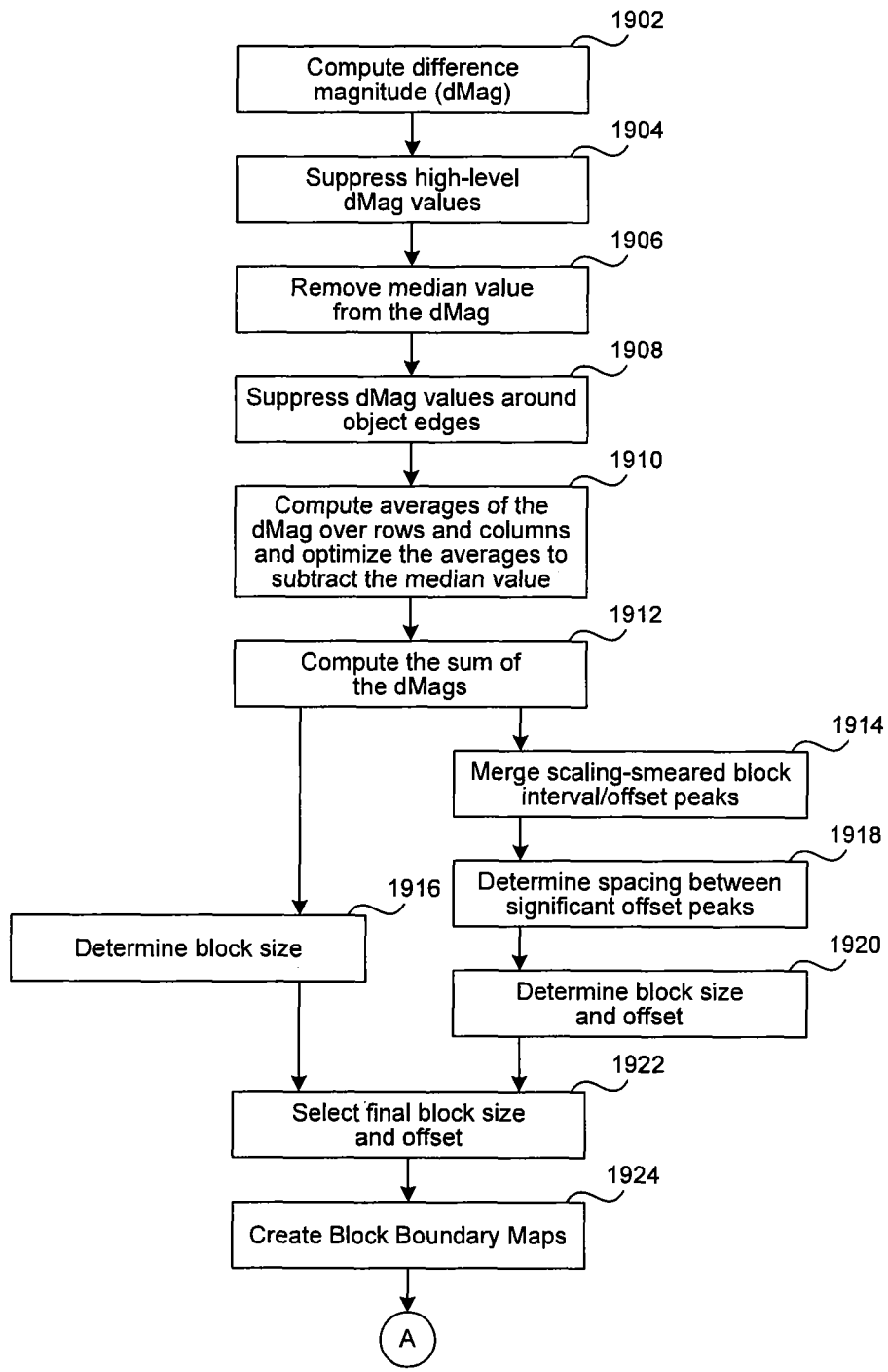
FIG. 19 depicts a flowchart of an example process for block noise detection.

FIG. 19 depicts a flowchart of an example process for block noise detection.

In process 1902, the difference magnitudes (dMag) are computed. In process 1904, high-level dMag values are suppressed. In process 1906, the median value is removed from the dMag. In process 1908, the dMag values are suppressed around object edges. In process 1910, averages of the dMag over rows and columns are computed and averages are optimized to subtract the median value. In process 1912, the sums of the dMags are computed and in some instances, normalized. Process 1914 merges peaks from the interval/offset sums with fixed offsets calculated in process block 1912. These merged-peak interval/offset sums are then examined to determine the spacing between the peaks of different offset values for each interval size in process block 1918. The peak spacings are then used as the basis of determining the block size and offset based on the interval offset sums with fixed intervals in process block 1920. In parallel with the processes 1914, 1918, and 1920, the normalized interval/offset sums computed using variable offsets are examined to determine block size in process block 1916. In process 1922 the block size and offset values determined by the two different methods in processes 1920 and 1916 are examined to select the final block size and offset.

Figure 20:
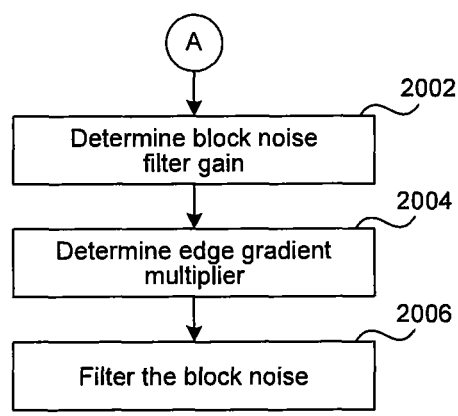
FIG. 20 depicts a flowchart of an example process for selecting control parameters for a block noise filter.

FIG. 20 depicts a flowchart of an example process for selecting control parameters for a block noise filter.

In process 2002, the block noise filter gain is determined. In process 2004, the edge gradient multiplier is determined. In process 2006, the block noise is filtered.

Figure 21:
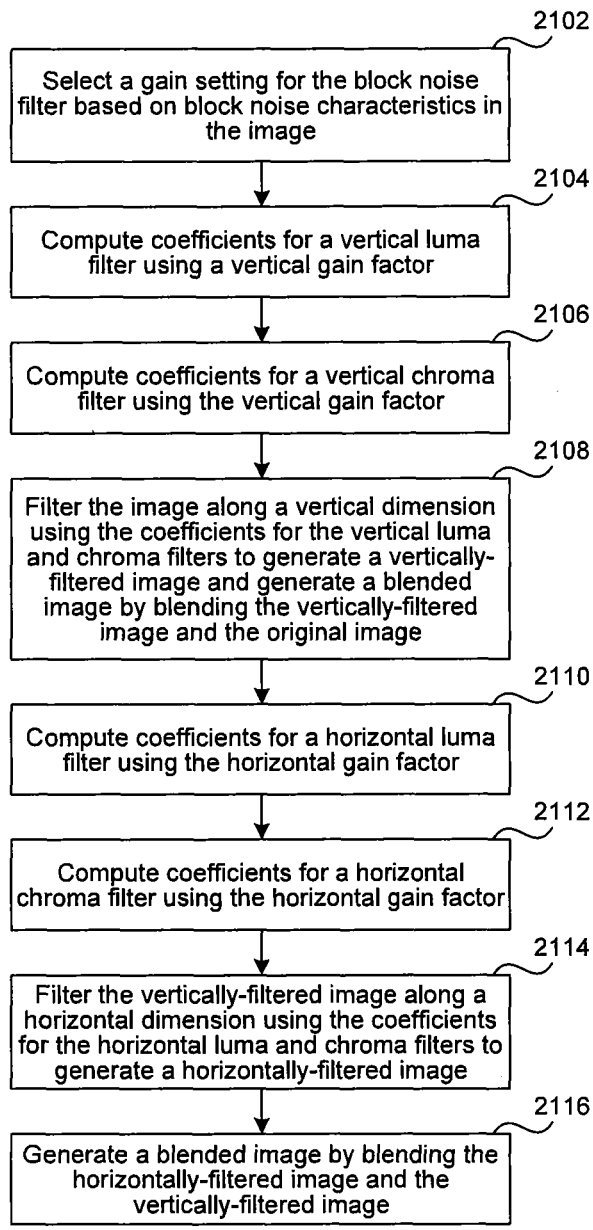
FIG. 21 depicts a flowchart of applying a block noise filter to an image.

FIG. 21 depicts a flowchart of applying a block noise filter to an image.

In process 2102, a gain setting is selected for the block noise filter based on block noise characteristics in the image. In process 2104, coefficients are computed for a vertical luma filter using a vertical gain factor.

In process 2106, coefficients for a vertical chroma filter are computed using the vertical gain factor. In process 2108, the image is filtered along a vertical dimension using the coefficients for the vertical and chroma filters to generate a vertically-filtered image and to generate a blended image by blending the vertically-filtered image and the original image.

In process 2110, coefficients for a horizontal luma filter are computed using the horizontal gain factor. In process 2112, coefficients are computed for a horizontal chroma filter using the horizontal gain factor. In process 2114, the vertically-filtered image is filtered along a horizontal dimension using the coefficients for the horizontal and chroma filters to generate a horizontally-filtered image. In process 2116, a blended image is generated by blending the vertically-filtered image and the horizontally-filtered image.

Figure 22:
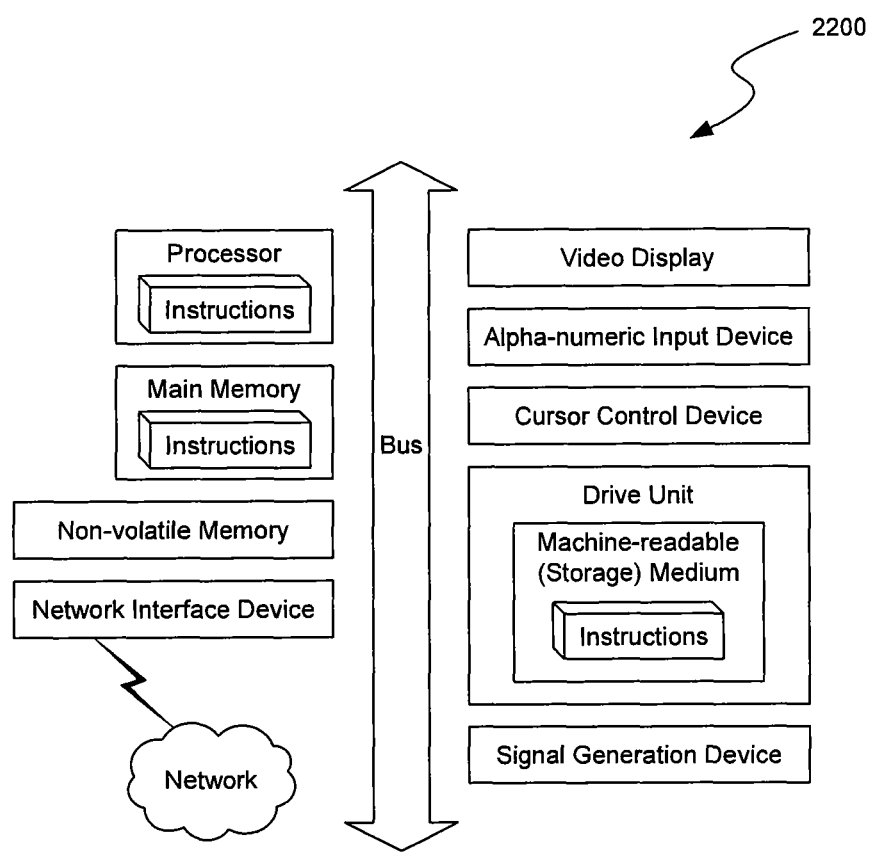
FIG. 22 shows a diagrammatic representation of a machine in the example form of a computer system within which a set of instructions, for causing the machine to perform any one or more of the methodologies discussed herein, may be executed.

FIG. 22 shows a diagrammatic representation of a machine in the example form of a computer system within which a set of instructions, for causing the machine to perform any one or more of the methodologies discussed herein, may be executed.

In the example of FIG. 22, the computer system 2200 includes a processor, memory, non-volatile memory, and an interface device. Various common components (e.g., cache memory) are omitted for illustrative simplicity. The computer system 900 is intended to illustrate a hardware device on which any of the components described in this specification can be implemented. The computer system 2200 can be of any applicable known or convenient type. The components of the computer system 2200 can be coupled together via a bus or through some other known or convenient device.

The processor may be, for example, a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer 2200. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

The bus also couples the processor to the network interface device. The interface can include one or more of a modem or network interface. It will be appreciated that a modem or network interface can be considered to be part of the computer system 2200. The interface can include an analog modem, isdn modem, cable modem, token ring interface, satellite transmission interface (e.g. "direct PC"), or other interfaces for coupling a computer system to other computer systems. The interface 208 can include one or more input and/or output devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device. For simplicity, it is assumed that controllers of any devices not depicted in the example of FIG. 22 reside in the interface.

In operation, the computer system 900 can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may thus be implemented using a variety of programming languages.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. §112, ¶3, other aspects may likewise be embodied as a means-plus-function claim, or in other forms, such as being embodied in a computer-readable medium. (Any claims intended to be treated under 35 U.S.C. §112, ¶3 will begin with the words "means for".) Accordingly, the applicant reserves the right to add additional claims after filing the application to pursue such additional claim forms for other aspects of the disclosure.

What is claimed is:

1. A method of detecting block noise in an image, the method, comprising:
   computing difference magnitudes in pixel values for adjacent pixels in the image;
       eliminating a set of difference magnitudes from the difference magnitudes resulting from features in the image;
       applying a median filter to the image to generate an output;
   subtracting the output from the difference magnitudes;
   performing edge detection in the image to detect edge pixel locations.

2. The method of claim 1, wherein, the difference magnitudes comprise horizontal difference magnitudes for horizontally adjacent pixels and vertical difference magnitudes for vertically adjacent pixels; further comprising,
   averaging the horizontal difference magnitudes in a vertical direction to generate a first vector of average values of the horizontal difference magnitudes of a width of the image;
   averaging the vertical difference magnitudes in a horizontal direction to generate a second vector of average values of the vertical difference magnitudes of a height of the image.

3. The method of claim 2, further comprising,
   plotting the first vector against pixel locations along the width of the image in a graph.

4. The method of claim 2, further comprising, plotting the second vector against pixel locations along the height of the image in a graph.

5. The method of claim 2, further comprising, removing a DC level from the average values of the vertical difference magnitudes or the average values of the horizontal difference magnitudes.

6. The method of claim 5, wherein, the DC level is removed by applying a median filter to the average values and subtracting the result from the average values.

7. The apparatus of claim 5, wherein, the optical disk reader is an HD-DVD reader.

8. The method of claim 2, further comprising, suppressing values in the first and
   second vectors near the edges of the image.

9. The method of claim 2, further comprising,
   determining normalized sums of the difference magnitudes for a set of candidate interval sizes and a set of candidate offsets;
   using a largest value of the normalized sums to determine an interval size and offset of the block noise.

10. The method of claim 9, further comprising, using the interval size and offset to determine a nominal block size and a starting boundary block location.

11. The method of claim 10,
    further comprising, identifying a subsequent boundary block location;
    wherein, the subsequent boundary block location is determined by:
    incrementing the starting block location by the nominal block size;
    identifying a location of a largest or near-largest difference magnitude value in a window around the subsequent boundary block location, and
    selecting the location of the largest or near-largest value as the subsequent block boundary location.

12. The method of claim 11, further comprising, generating a block boundary map using multiple subsequent boundary block locations.

13. The method of claim 9, further comprising,
    determining three normalized sums of the difference magnitudes;
    wherein, in a first summation of the three normalized sum, computing sum values using a nominal location and the nominal location −1 and selecting the location that yields a larger of the sum values;
    wherein, in a second summation of the three normalized sum, computing sum values using a nominal location and the nominal location +1 and selecting the location that yields a larger of the sum values;
    wherein, in a third summation of the three normalized sum, computing a sum value using the nominal location selecting the nominal location.

14. The method of claim 13, further comprising, identifying a candidate interval size and offset value which generates a max normalized sum of difference magnitude;

compare the max normalized sum to sums computed for the other two offset values of the candidate interval size to determine a block size of the block noise and to select a final block size and offset value using the nominal block size and the starting boundary location.

15. The method of claim 9, further comprising, using normalized sums to determine a set of noise characteristics of the block noise and using difference magnitude data to determine a set of image characteristics of the image.

16. The method of claim 15, wherein, the set of noise characteristics include, strength of block noise and block size;

wherein, the set of image characteristics include, amount of detail in the image.

17. The method of claim 15, further comprising, determining a gain value for a block noise filter using the set of noise and image characteristics.

18. The method of claim 2, wherein, the suppressing the edge difference magnitudes at the edge pixel locations further comprises:

setting the edge difference magnitude to zero at a location of the edge pixel locations where a corresponding gradient magnitude equals or exceeds a gradient threshold value.

19. The method of claim 2, wherein, the difference magnitudes are computed for luma and chroma.

20. The method of claim 19, further comprising, generating a chroma block boundary map using the difference magnitudes computed for the chroma and a luma block boundary map using the difference magnitudes computed for the luma.

21. The method of claim 1, further comprising, using the difference magnitudes to determine whether the image is scaled.

22. The method of claim 1, wherein, the horizontally and vertically adjacent pixels are of I-pixel differentials.

23. The method of claim 1, further comprising, attenuating the set of difference magnitudes by identifying the set of difference magnitudes equal to or exceeding a threshold value and setting the set of difference magnitudes to the threshold value.

24. The method of claim 1, wherein, the subtracting the output of the median filter from the difference magnitudes further comprises: clipping values less than zero at zero.

25. The method of claim 1, wherein, the edge detection is performed using Sobel filters.

26. The method of claim 25, wherein, the Sobel filters are 3×3.

* * * * *